United States Patent [19]

Shinohara et al.

[11] Patent Number: 5,192,964
[45] Date of Patent: Mar. 9, 1993

[54] CAMERA HAVING BLURRING MOVEMENT CORRECTION MECHANISM

[75] Inventors: Junichi Shinohara, Yokohama; Yoshimi Ohno, Kawasaki; Yoshio Serikawa, Ageo; Tohru Nishida, Yokohama, all of Japan

[73] Assignee: Ricoh Company, Ltd., Tokyo, Japan

[21] Appl. No.: 847,759

[22] Filed: Mar. 4, 1992

[30] Foreign Application Priority Data

| Mar. 4, 1991 | [JP] | Japan | 3-61068 |
| Mar. 4, 1991 | [JP] | Japan | 3-61069 |
| Mar. 6, 1991 | [JP] | Japan | 3-63685 |
| Nov. 30, 1991 | [JP] | Japan | 3-342441 |

[51] Int. Cl.⁵ .................................................. G03B 5/00
[52] U.S. Cl. ..................................... 354/202; 358/222
[58] Field of Search ................ 354/430, 70, 202, 295; 358/222; 359/554

[56] References Cited

U.S. PATENT DOCUMENTS 4,623,930  11/1986  Oshima et al. .................... 358/222
5,109,249   4/1992  Kitajima ............................ 354/430

*Primary Examiner*—W. B. Perkey
*Attorney, Agent, or Firm*—Oblon, Spivak, McClelland, Maier & Neustadt

[57] ABSTRACT

A camera having blurring movement correction mechanism comprising: an optical element arranged to correct shift of an image formed on a film surface caused by movement of hands holding a camera body; an actuator for moving the optical element in a necessary direction for correcting the image shift; a detection unit for obtaining a blurring movement detection data by converting the movement of the camera body to an electric signal; a first memory unit for temporarily registering the detection data output from the detection unit; a calculation unit for calculating blurring movement correction data for correcting the image shift caused by movement of the camera body by actuating the optical element by the actuator; and a second memory unit for temporarily registering data of calculation. The correction data is predictively calculated from the detection data of this time obtained from the detection unit, the detection data of the preceding time registered in the first memory unit and the correction data of the preceding time registered in the second memory unit.

12 Claims, 14 Drawing Sheets

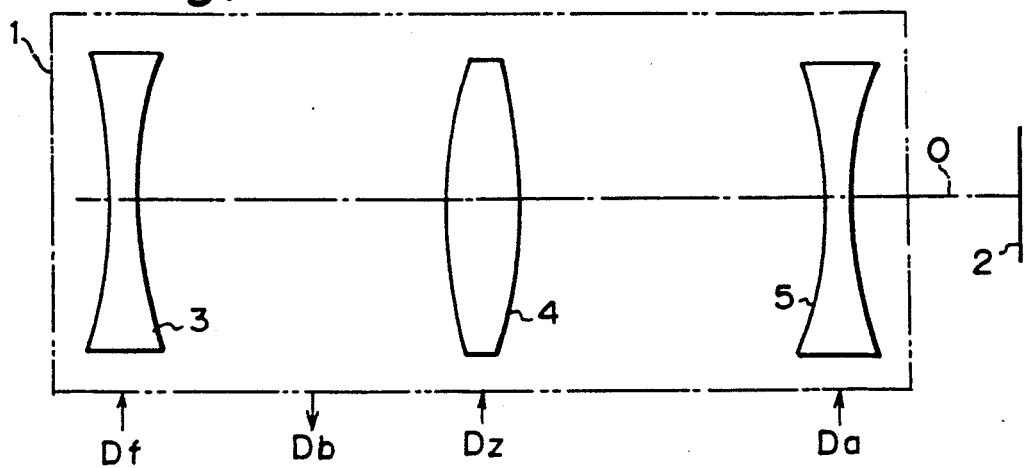
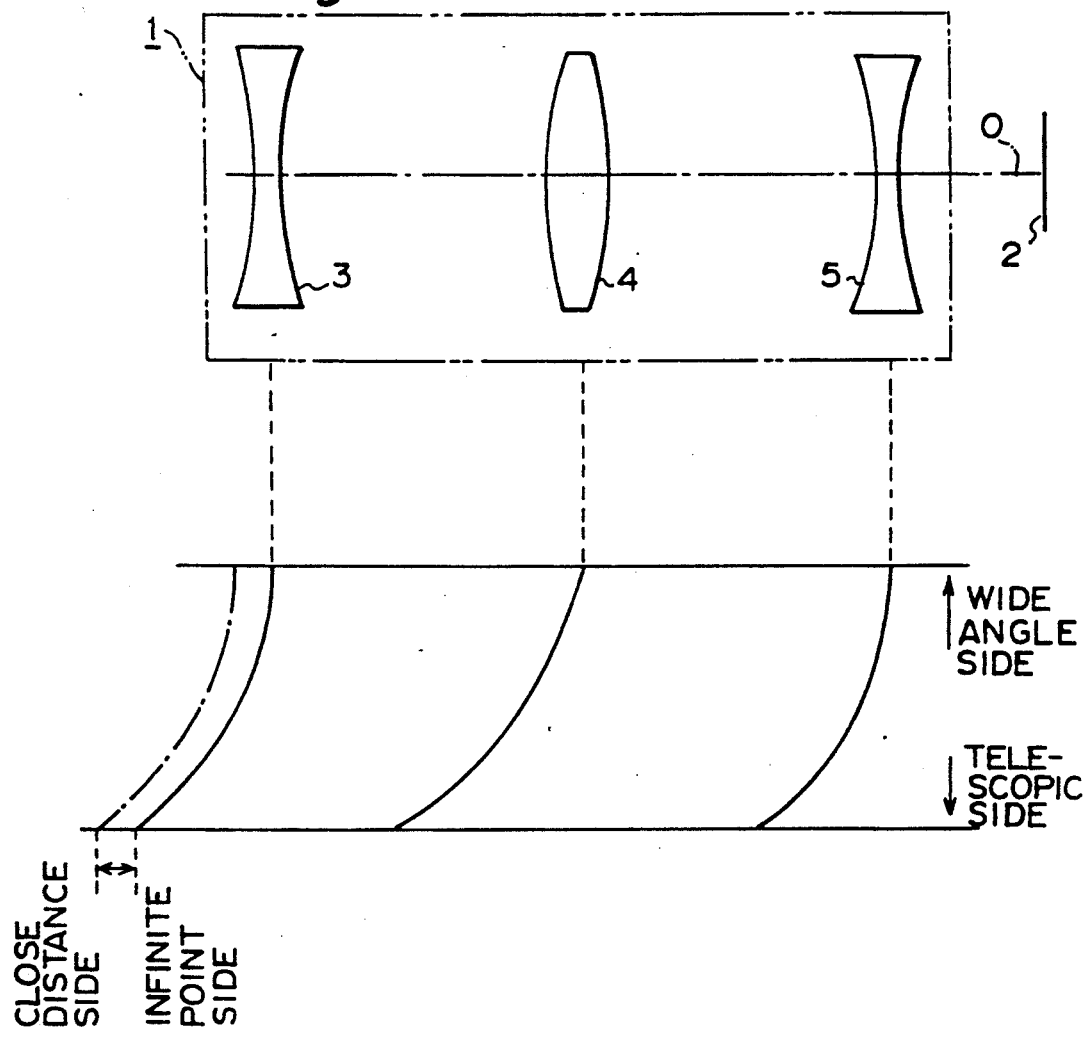

CAMERA HAVING BLURRING MOVEMENT CORRECTION MECHANISM

BACKGROUND OF THE INVENTION

1. Field of the Invention

The present invention relates to a camera having a blurring movement correction mechanism, more precisely, it relates to a camera which is equipped with a correction mechanism that detects unintentional movement of hands holding the camera and that cancels the movement of the image formed on the film surface corresponding to the unintentional motion of hands in response to the detection results of the motion of the camera by driving an optical correction unit which is disposed on an optical path of a fixed focal length optical system or a variable focal length optical system of the camera.

2. Description of the Related Art

In general, a camera having an unintentional blurring movement correction or cancelling mechanism (which is called simply camera hereinafter) is constructed in such a way that, in an example where the camera is provided with a zoom lens as a photo-taking optical system, the photo-taking optical system is detachably arranged in the camera as an integral unit of the camera body or through a lens mount and that a film surface is disposed behind the lens system on an optical axis of the lens system.

The photo-taking optical system comprises a focusing lens group constituted from a plurality of lenses and a zooming lens group constituted from a plurality of lenses. A blurring correction optical element is disposed on an optical path of the lens groups.

The focusing lens group is driven to become an in-focus state by a focus command signal Df. The zoom lens group is driven to achieve a zooming function by a zoom command signal Dz. Also, the blurring correction lens element is driven to correct or compensate for the blur of photo-image caused by unintentional motion of hands by a blur correction command signal Da.

Next, the functional motion of each lens group is described below. The focusing lens group is driven to move forward according as the focal length is shifted to the telescopic side and according as the length to the subject to be taken is shortened.

The zoom lens group is driven to move forward according as the focal length is shifted toward the telescopic side. Similarly, the blur correction optical element is driven to move forward according as the zoom lens group is driven to move toward the telescopic side.

Next, the blur correction command signal Da is more concretely described below.

The example is the case where the oscillation motion of the camera body caused by unintentional movement of hands has an oscillation characteristic of approximately sine wave form curve (a) representing an amplitude curve that moves to the positive and negative directions from the boundary of zero level.

To correct blur of photograph, that is, to minimize or compensate for influence to the subject image on the film caused by unintentional movement of hands holding the camera body that blurs the photograph, the blur correction mechanism of the camera is arranged as follows.

First, a hand movement detection unit arranged within the camera body detects the velocity V of the hand movement within a very short period of time. Then, a movement velocity changing amount data Bk is calculated on the basis of the detected velocity data. The blur (hand movement) correction command signal Da is obtained from the velocity changing amount data Bk. The signal Da is used to drive the blur correction optical element to move in the direction in which the motion of the camera caused by the hand movement is canceled so as to prevent the image of the subject on the film surface from moving on the film surface.

The correction motion is always delayed from the actual unintentional motion of the camera.

More precisely, the movement velocity is detected at a plurality of times $(t-2It)$, $(t-It)$, $(t)$, $(t+It)$ ..., wherein (It) represents the integration time period for each time to detect the velocity. The velocity changing amount data $B_k$, $B_{k-1}$, ... is calculated on the basis of each velocity detection data. Then, on the basis of each velocity changing amount data $B_k$, $B_{k-1}$, ... is calculated a camera motion velocity data $V_k$, $V_{k-1}$, ... which is used to generate the blur correction command signal Da.

Therefore, the image formed on the film surface moves in accordance with a corrected characteristic (f) which is compensated with the use of correction characteristic (d) with respect to the movement amount characteristic (e).

However, in accordance with the above mentioned correction arrangement, only about one fourth of the total movement amount of the camera body can be corrected.

In order to improve this point of correction amount ratio, an arrangement is proposed wherein the input amount to the drive circuit for the blur correction optical element is controlled so as to converge the oscillation of the movement of the camera body at the time of driving the optical system for correcting the movement of the camera.

Such an arrangement is disclosed in Japanese Patent Application Laying Open (KOKAI) No.1-300221, for instance. In accordance with the arrangement disclosed in the patent document, the amplifying ratio of the drive circuit for the blur correcting optical element is varied in response to the output from the movement detection unit so that the oscillation movement of the camera body caused by the unintentional movement of hands is attenuated to converge.

Also, the above mentioned patent document discloses another arrangement for attenuating the movement of the camera body with the use of the above mentioned electric means for varying the amplifying ratio of the drive circuit wherein the rigidity of the oscillation detecting sensor for detecting the movement of hands holding the camera body is varied to attenuate the oscillation so as to increase the correction amount ratio of the unintentional oscillation.

On the other hand, the actual amount of the driving amount for correcting the movement of the camera varies in accordance with the length to the subject. This point is described more precisely below.

A photo-taking optical system R is constituted from a film 2 disposed at a rear portion in the camera body P and a principal point Q positioned at a front portion in the camera body. When the camera body P moves upward from the optical axis O by the length y1, an image of a subject point A1 on the optical axis O is formed at an intersection point A3 between the film 2 and a line passing through the point A1 and a point B2 which is a point at a length y1 upward from a point B1 which is an intersection point between the optical axis O and the vertical line of the principal point Q.

On the other hand, in the initial position of the camera (the position of the camera before the camera is moved), the image forming point for the subject point A1 is at a point A2 on the film which point A2 is an intersecting point of the optical axis to the film. The point A2 corresponds to a point A4 on the film after the camera is moved which point A4 is length y1 upward from the point A2. Therefore, by moving the camera body upward by the length y1, the point A4 is moved to the point A3 on the film.

Accordingly, it becomes possible to prevent the image forming point on the film from being shifted from the point A4 to A3 when the camera body is moved upward by the length y1, by shifting the photo-taking optical system on the principal point line Q from the point B1 to the point B3 which is the intersection point of the line between the points A1 and A4 to the vertical line Q.

Assuming that the length between the points B2 and B3 is represented by y2, the length from the principal point Q to the film surface is represented by x1 and that the length from the point A1 to the principal point Q is represented by x2, the following equations are satisfied.

$$y1/(x1+x2)=(y1-y2)/x2$$

$$y2=(x1/(x1+x2))y2$$

There length y2 is influenced from the length x2 to the subject. Accordingly, it becomes desirable to correct the blur correction command signal Da with the use of the data of length from the camera to the subject.

In accordance with the camera mentioned above, blur caused by unintentional movement of hands is prevented in such a way that movement of camera due to movement of hands is detected first, that on the basis of the detection data is calculated a drive amount for driving the movement compensation optical element and that in response to the calculation result is driven the optical element.

However, in accordance with such an arrangement for correcting the blur due to the hand motion, the following problems are involved.

First, the timing point of obtaining the calculation result is inevitably retarded from the timing point of detecting the movement of the camera and also the timing point of driving the optical system for correcting the motion of the camera is inevitably retarded from the timing point of obtaining the calculation result. Accordingly, there is always some deficiency in correction amount due to the delay of each functional timing point inevitably generated in the blur correction optical system so that the movement of the camera is not satisfactorily corrected.

Such a problem may not be significant when the movement amount of hands is relatively small, since the deficiency of correction amount is also small in that case so that the practical correcting function of the optical system according to the related art mentioned above is not critically impaired. However, such a problem becomes significant when the movement amount of hands becomes large since the deficiency of correction amount becomes large as well.

Secondly, there has been no consideration to the point that the necessary movement correction amount changes according to the focal length of the photo-taking optical system, that is, the shift amount of the image position on the film surface becomes large according as the focal length becomes large even when the movement amount of the camera body itself is the same. Therefore, the unintentional movement of the camera is not satisfactorily controlled and can not be fully cancelled according to the related art mentioned above.

For example, in the case where focal length of the photo-taking optical system changes from about a wide angle of 35 mm to a telescope of 70 mm and where the blur correction system is driven on the basis of the most telescopic side in which the correction condition is most severe, when the focal length of the photo-taking optical system is arranged on the wide angle side, then the correcting function of the system becomes much more than being necessitated so that an accurate and appropriate function for correcting the unintentional motion of the camera is not achieved by the blur correction system mentioned above.

Besides, there has been no consideration to the point, either, that the necessary movement correction amount changes according to the length to the subject, that is, the shift amount of the image position on the film surface becomes large according as the length to the subject becomes small (subject comes close to the camera), even when the movement amount of the camera body itself is the same. Therefore, the unintentional movement of the camera is not satisfactorily controlled and can not be fully cancelled according to the related art mentioned above.

More precisely, in accordance with the camera of the related art mentioned above, the blur correcting optical element is driven on the basis of the movement correcting amount data which is obtained using the most frequently arranged or most common or usual length of the subject as the reference of the calculation of the correcting amount data, which impairs the accurate and reliable movement correcting operation in the wide range of subject length from a close distance to an infinite point.

SUMMARY OF THE INVENTION

The present invention was made considering the above mentioned points. It is therefore a primary object of the present invention to provide a camera which is able to obviate blurring of the photograph by reliably and appropriately correcting unintentional movement of hands irrespective of the magnitude of the movement not only in the case where the movement amount is small but the movement amount is very large as well.

Also, it is a second object of the present invention to provide a camera which is able to obviate blurring of the photograph by reliably and appropriately correcting unintentional movement of hands irrespective of the magnitude of the movement not only in the case where the movement amount is small but the movement amount is very large as well and also irrespective of the focal length set in the arrangement of the variable focal length photo-taking optical system.

A third object of the present invention is to provide a camera which is able to obviate blurring of the photograph by reliably and appropriately correcting unintentional movement of hands irrespective of the magnitude of the movement not only in the case there the movement amount is small but the movement amount is very large as well and also irrespective of the length to the subject.

The above mentioned objects of the present invention can be achieved by
a camera having blurring movement correction mechanism comprising:
a blurring movement correction optical element disposed in an optical path of a photo-taking optical system so as to correct shift of an image formed on a film surface caused by movement of hands holding a camera body;
a blurring movement correction actuator for moving the optical element in a necessary direction for correcting the shift of the image on the film surface;
a blurring movement detection unit for obtaining a blurring movement detection data by converting the blurring movement of the camera body to an electric signal;
a first memory unit for temporarily registering the detection data output from the detection unit;
a calculation unit for calculating blurring movement correction data for correcting the shift of the image formed on the film surface caused by movement of hands holding the camera body by actuating the optical element by the actuator; and
a second memory unit for temporarily registering an output data of calculation from the calculation unit,
the calculation unit being so constructed that the blurring movement correction data is predictively calculated on the basis of the detection data of this time obtained from the detection unit, the detection data of the preceding time registered in the first memory unit and the correction data of the preceding time registered in the second memory unit so as to correct said shift of the image formed on the film surface by actuating said optical element by said actuator.

In accordance with the above mentioned structure of the camera according to the present invention, a movement correcting actuator is driven to move or incline the movement correcting optical element in the directed direction which element is disposed in an optical path of the photo-taking optical system for correcting the shift motion of the image on the film surface caused by unintentional movement of hands holding the camera body. The actuator is driven in such a way that the movement of the camera body is detected by a movement detection unit which outputs an electric detection signal of movement detection data which is then temporarily registered in a first memory means, that movement correction amount data is calculated by a calculation means on the basis of the movement detection data registered in the first memory means and that the calculation data output from the calculation means is registered in a second memory means.

In that function of the present invention structure mentioned above, on either the basis of the movement detection data detected by the movement detection unit, the movement detection data registered in the first memory means and the movement correction amount data registered in the second memory means or on the basis of the subject distance data measured by a distance measuring means, the calculation means predictively calculates the movement correction amount data of first or second degree of approximation for predicting the correcting amount of the image position on the film surface which is to be corrected by driving the optical element. Also, in the case where the photo-taking optical system comprises a variable focal length system, the calculation means predictively calculates the image shifting motion on the film surface by adding correction in response to the focal length to the correction amount data. The unintentional movement of camera body is corrected on the basis of the predictively calculated data output from the calculation means.

The necessary data for predicting the image motion may be obtained either from two operations of the camera, that is, this time operation and the preceding operation or from three operations, that is, this time operation, the preceding operation and the preceding operation before the preceding operation.

Further, the movement detection unit detects, for example, acceleration generated in the camera body which is then integrated in the predetermined integration period to generate the movement correction amount data.

In accordance with the present invention, at the time when the movement correction optical element disposed on the optical path of the photo-taking optical system is to be driven to move in the direction cancelling the influence from the unintentional movement of hands holding the camera body, a movement correction amount data for correcting the unintentional movement at the time of driving the optical element is predictively calculated on the basis of velocity data of camera motion and movement changing amount data obtained at a plurality of timings at predetermined regular intervals. And the calculated data is used for correcting the unintentional movement of the camera body.

Therefore, it is an advantage of the present invention that it becomes possible to effectively correct and cancel the unintentional movement of hands irrespective of the degree of the movement of user's hands and even when the camera is unintentionally moved continuously.

It is another advantage of the present invention that the unintentional movement of hands can be accurately corrected in the whole range of variable focal length by the arrangement wherein the focal length of the phototaking optical system now on being operated is detected so that the correction amount data is corrected on the basis of the zoom position data obtained in the operation at this time.

Further, it is still another advantage of the present invention that it becomes possible to accurately correct the unintentional movement of hands in the whole range of subject distance from a close position to an infinite point since the movement correction amount data is corrected on the basis of the subject distance data obtained by detecting the length to the subject.

As mentioned above, in accordance with the present invention, it becomes possible to provide a camera which enables to take a high quality photograph without blurring of the photo.

Further objects and advantages of the present invention will be apparent from the following description of the preferred embodiments of the invention as illustrated in the accompanying drawings.

BRIEF DESCRIPTION OF THE DRAWINGS

FIG. 1 is an explanatory view for explaining the construction of the camera having a blur correction mechanism according to the related art;

FIG. 2 is an explanatory view for graphically explaining the function of the blur correction mechanism of FIG. 1;

DESCRIPTION OF THE PREFERRED EMBODIMENTS

Figure 3:
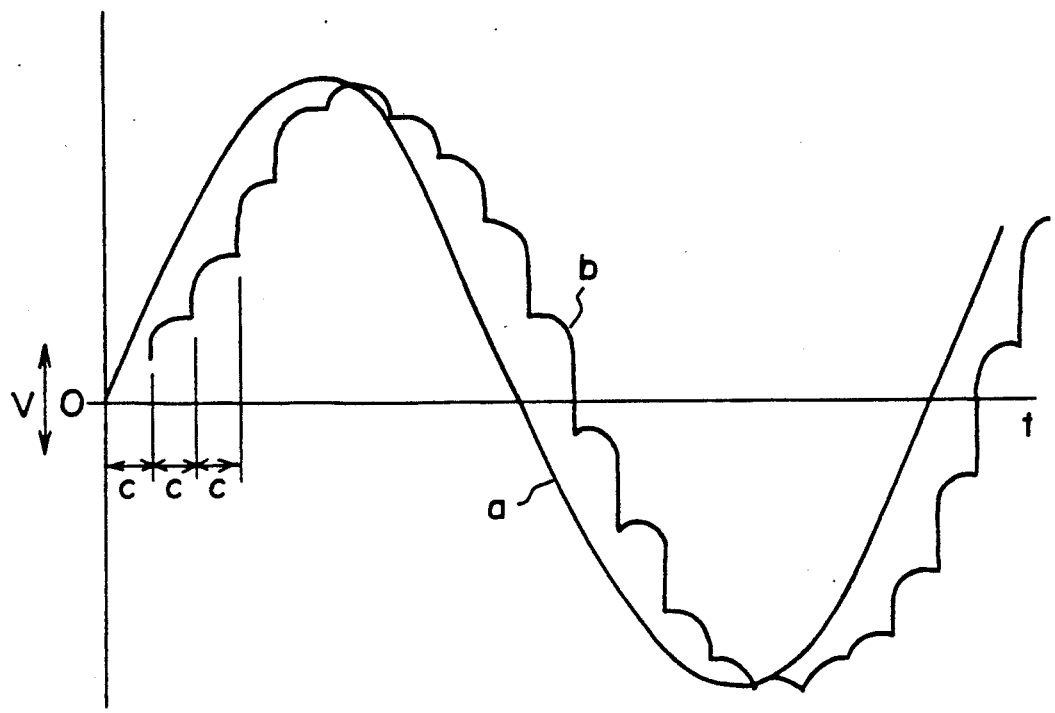
FIG. 3 is a graphical view of wave-forms representing the movement correcting function of the camera according to the related art.

Embodiments of the present invention are described hereinafter in detail with reference to the drawings and in comparison to the related art which is also described referring to the drawings.

In general, a camera having a blur correction mechanism (which is called simply camera hereinafter) is constructed in such a way that, in an example where the camera is provided with a zoom lens as a photo-taking optical system, as illustrated in FIGS. 1 and 2, the photo-taking optical system 1 is detachably arranged in the camera as an integral unit of the camera body or through a lens mount and that a film surface 2 is disposed behind the lens system 1 on an optical axis (O) of the lens system 1.

The photo-taking optical system 1 comprises a focusing lens group 3 constituted from a plurality of lenses and a zooming lens group 4 constituted from a plurality of lenses. A blurring correction optical element 5 is disposed on an optical path of the lens groups.

The focusing lens group 3 is driven to become an in-focus state by a focus command signal Df. The zoom lens group 4 is driven to achieve a zooming function by a zoom command signal Dz. Also, the blurring correction lens element 5 is driven to correct or compensate for the blur of photo-image caused by unintentional motion of hands by a blur correction command signal Da.

Next, the functional motion of each lens group 3, 4, 5 is described below. The focusing lens group 3, in this particular example, is driven to move forward according as the focal length is shifted to the telescopic side and according as the length to the subject to be taken is shortened.

The zoom lens group 4 is driven to move forward according as the focal length is shifted toward the telescopic side. Similarly, the blur correction optical element 5 is driven to move forward according as the zoom lens group 4 is driven to move toward the telescopic side.

Next, the blurring movement correction command signal Da is more concretely described below.

The example is the case where the oscillation motion of the camera body caused by unintentional movement of hands has an oscillation characteristic of approximately sine wave form curve (a), as illustrated in FIG. 3, representing an amplitude curve that moves to the positive and negative directions from the boundary of zero level.

To correct blur of photograph, that is, to minimize or compensate for influence to the subject image formed on the film caused by unintentional movement of hands holding the camera body that blurs the photograph, the blurring movement correction mechanism of the camera is arranged as follows.

First, a hand movement detection unit arranged within the camera body detects the velocity V of the hand movement within a very short period of time. Then, a movement velocity changing amount data Bk is calculated on the basis of the detected velocity data. The blur (hand movement) correction command signal Da is obtained from the velocity changing amount data $B_k$. The signal Da is used to drive the blur correction optical element to move in the direction in which the motion of the camera caused by the hand movement is canceled so as to prevent the image of the subject on the film surface 2 from moving on the film surface.

However, the correction motion is always delayed from the actual unintentional motion of the camera, as illustrated by curve (b) in FIG. 3.

Figure 4:
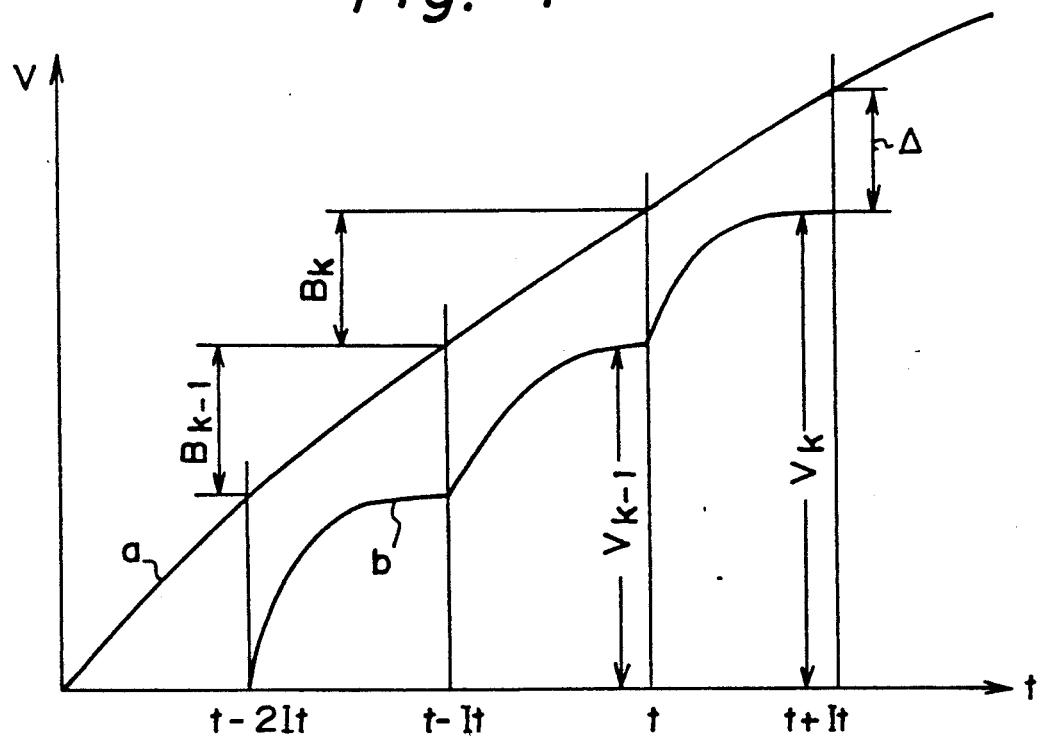
FIG. 4 is a partial enlarged view of the graph of FIG. 3.

More precisely, as illustrated by enlarged graphs in FIG. 4, the movement velocity is detected at a plurality of times (t−2It), (t−It), (t), (t+It) . . . , wherein (It) represents the integration time period for each time to detect the velocity. The velocity changing amount data $B_k$, $B_{k-1}$, . . . is calculated on the basis of each velocity detection data. Then, on the basis of each velocity changing amount data $B_k$, $B_{k-1}$, . . . is calculated a camera motion velocity data $V_k$, $V_{k-1}$, . . . which is used to generate the blurring movement correction command signal Da.

Figure 5:
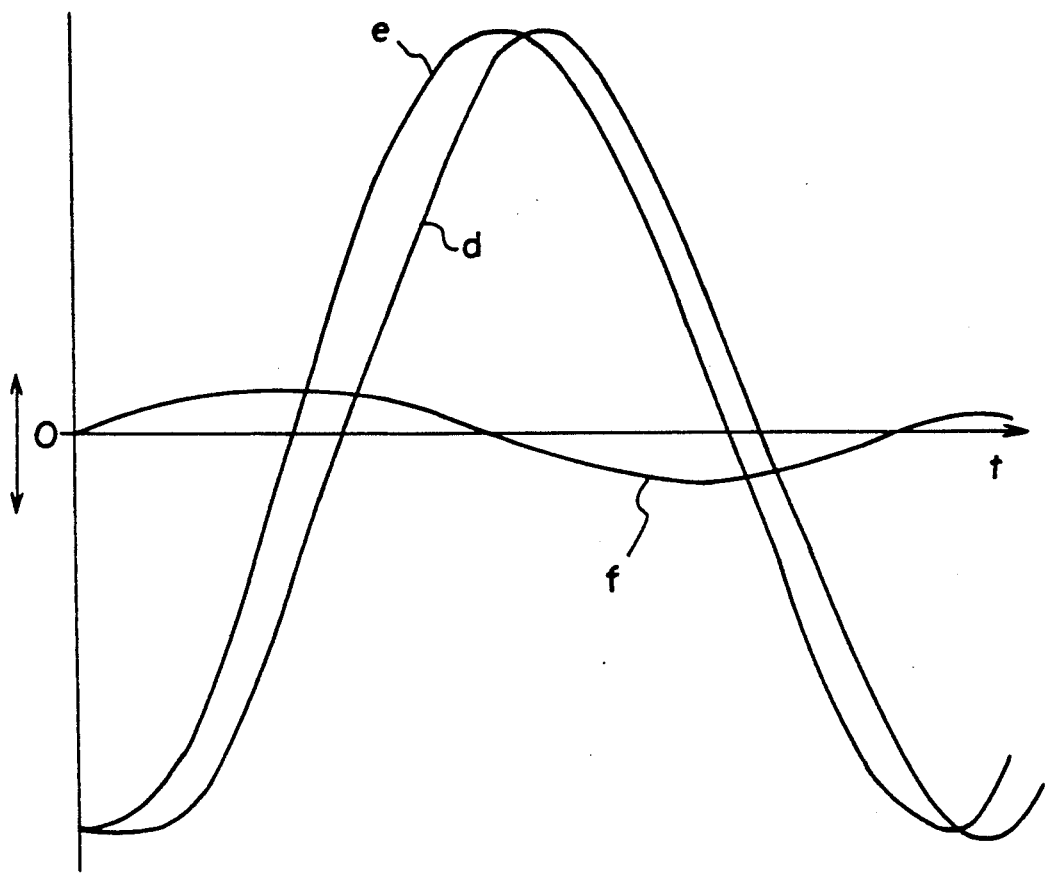
FIG. 5 is a graphical view of wave-forms representing changing amount of movement of hands in relation to time after the correctional function of the camera according to the related art.

Therefore, the image formed on the film surface 2 moves in accordance with a corrected characteristic (f) which is compensated with the use of correction characteristic (d) with respect to the movement amount characteristic (e), as represented in FIG. 5.

However, in accordance with the above mentioned correction arrangement, only about one fourth of the total movement amount of the camera body can be corrected.

In order to improve this point of correction amount ratio, an arrangement is proposed wherein the input amount to the drive circuit for the blur correction optical element is controlled so as to converge the oscillation of the movement of the camera body at the time of driving the optical system for correcting the movement of the camera.

Such an arrangement is disclosed in Japanese Patent Application Laying Open (KOKAI) No.1-300221, for instance. In accordance with the arrangement disclosed in the patent document, the amplifying ratio of the drive circuit for the blur correcting optical element is varied in response to the output from the movement detection unit so that the oscillation movement of the camera body caused by the unintentional movement of hands is attenuated to converge.

Also, the above mentioned patent document discloses another arrangement for attenuating the movement of the camera body with the use of the above mentioned electric means for varying the amplifying ratio of the drive circuit wherein the rigidity of the oscillation detecting sensor for detecting the movement of hands holding the camera body is varied to attenuate the oscillation so as to increase the correction amount ratio of the unintentional oscillation.

Figure 6:
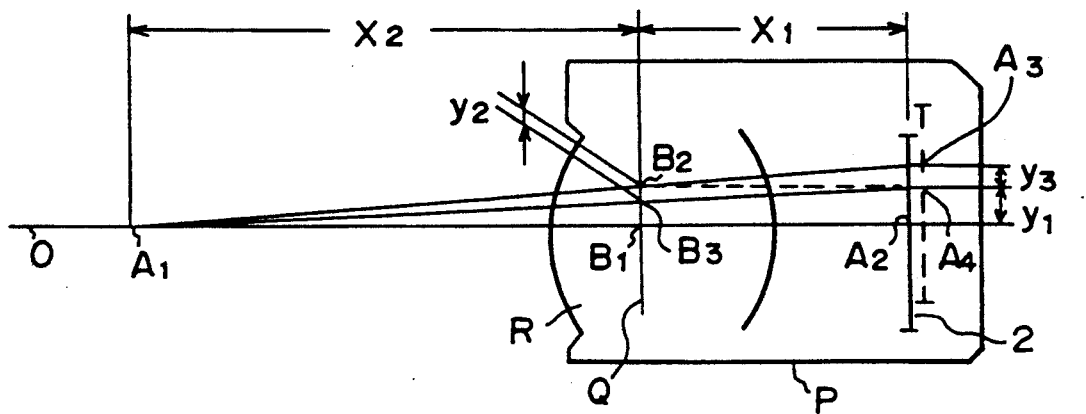
FIG. 6 is an explanatory view for explaining the shift of the image of the subject at any distance formed on the film in relation to the movement of the camera.

On the other hand, the actual amount of the driving amount for correcting the movement of the camera varies in accordance with the length to the subject. This point is described more precisely below referring to FIG. 6.

A photo-taking optical system R is constituted from a film 2 disposed at a rear portion in the camera body P and a principal point Q positioned at a front portion in the camera body. When the camera body P moves upward from the optical axis O by the length y1, an image of a subject point A1 on the optical axis O is formed at an intersection point A3 between the film 2 and a line passing through the point A1 and a point B2 which is a point at a length y1 upward from a point B1 which is an intersection point between the optical axis O and the vertical line of the principal point Q.

On the other hand, in the initial position of the camera (the position of the camera before the camera is moved), the image forming point for the subject point A1 is at a point A2 on the film 2 which point A2 is an intersecting point of the optical axis to the film 2. The point A2 corresponds to a point A4 on the film 2 after the camera is moved which point A4 is length y1 upward from the point A2. Therefore, by moving the camera body upward by the length y1, the point A4 is moved to the point A3 on the film.

Accordingly, it becomes possible to prevent the image forming point on the film from being shifted from the point A4 to A3 when the camera body is moved upward by the length y1, by shifting the photo-taking optical system on the principal point line Q from the point B1 to the point B3 which is the intersection point of the line between the points A1 and A4 to the vertical line Q.

Assuming that the length between the points B2 and B3 is represented by y2, the length from the principal point Q to the film surface is represented by x1 and that the length from the point A1 to the principal point Q is represented by x2, the following equations are satisfied.

$$y1/(x1+x2)=(y1-y2)/x2$$

$$y2=(x1/(x1+x2))y1$$

Therefore, the length y2 is influenced from the length x2 to the subject. Accordingly, it becomes desirable to correct the blurring movement correction command signal Da which is mentioned above with reference to FIG. 6 with the use of the data of length from the camera to the subject.

In accordance with the camera mentioned above, blur caused by unintentional movement of hands is prevented in such a way that movement of camera due to movement of hands is detected first, that on the basis of the detection data is calculated a drive amount for driving the movement compensation optical element and that in response to the calculation result is driven the optical element.

However, in accordance with such an arrangement for correcting the blur due to the hand motion, the following problems are involved.

First, as illustrated in FIG. 3 represented by letter (c), the timing point of obtaining the calculation result is inevitably retarded from the timing point of detecting the movement of the camera and also the timing point of driving the optical system for correcting the motion of the camera is inevitably retarded from the timing point of obtaining the calculation result. Accordingly, there is always some deficiency in correction amount due to the delay of each functional timing point inevitably generated in the blur correction optical system so that the movement of the camera is not satisfactorily corrected.

Such a problem may not be significant when the movement amount of hands is relatively small, since the deficiency of correction amount is also small in that case so that the practical correcting function of the optical system according to the related art mentioned above is not critically impaired. However, such a problem becomes significant when the movement amount of hands becomes large since the deficiency of correction amount becomes large as well.

Secondly, there has been no consideration to the point that the necessary movement correction amount changes according to the focal length of the photo-taking optical system, that is, the shift amount of the image position on the film surface becomes large according as the focal length becomes large even when the movement amount of the camera body itself is the same. Therefore, the unintentional movement of the camera is not satisfactorily controlled and can not be fully cancelled according to the related art mentioned above.

For example, in the case where focal length of the photo-taking optical system changes from about a wide angle of 35 mm to a telescope of 70 mm and where the blur correction system is driven on the basis of the most telescopic side in which the correction condition is most severe, when the focal length of the photo-taking optical system is arranged on the wide angle side, then the correcting function of the system becomes much more than being necessitated so that an accurate and appropriate function for correcting the unintentional motion of the camera is not achieved by the blur correction system mentioned above.

Besides, there has been no consideration to the point, either, that the necessary movement correction amount changes according to the length to the subject, that is, the shift amount of the image position on the film surface becomes large according as the length to the subject becomes small (subject comes close to the camera), even when the movement amount of the camera body itself is the same. Therefore, the unintentional movement of the camera is not satisfactorily controlled and can not be fully cancelled according to the related art mentioned above.

More precisely, in accordance with the camera of the related art mentioned above, the blur correcting optical element is driven on the basis of the movement correcting amount data which is obtained using the most frequently arranged or most common or usual length of the subject as the reference of the calculation of the correcting amount data, which impairs the accurate and reliable movement correcting operation in the wide range of subject length from a close distance to an infinite point.

The above mentioned problems can be obviated by the embodiments of the present invention described below with reference to FIGS. 7 to 18.

Figure 7:
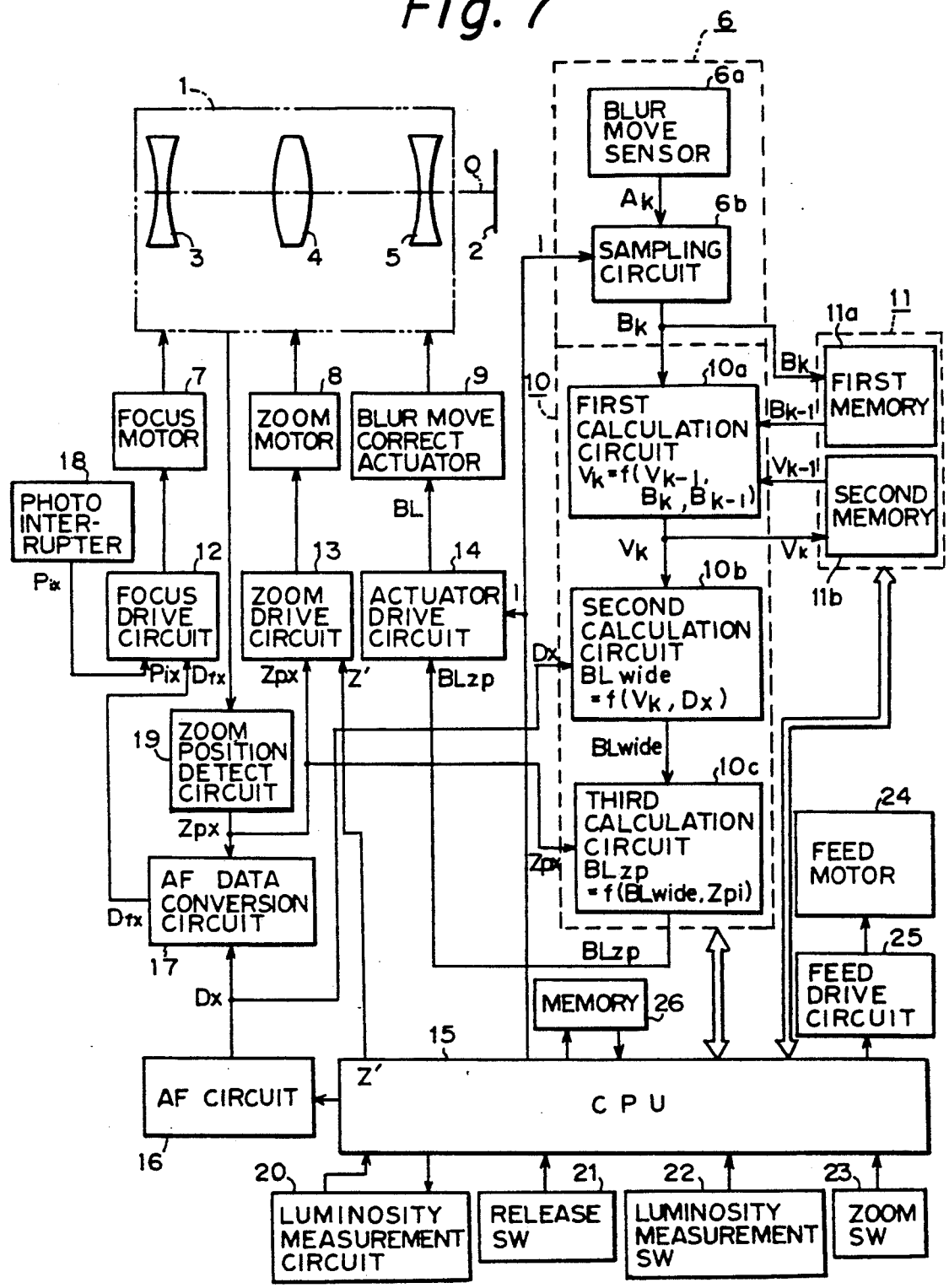
FIG. 7 is a block diagram of the electrical circuit of the camera in accordance with a first embodiment of the present invention.

FIG. 7 illustrates a block diagram of the electric circuit of the blurring movement correction mechanism in accordance with a first embodiment of the present invention.

A film surface 2 is positioned on an optical axis (0) of a photo-taking optical system 1 which is detachably arranged in a camera body as an integral structure forming one unit with the camera body as is the case of a compact handy camera or through a lens mount.

The optical system 1 comprises a focussing lens group 3 constituted from a plurality of lenzes, a zoom lenz group 4 constituted from a plurality of lenses and a blurring movement correcting optical element 5 for correcting the position of the optical axes of the lens groups 3 and 4 in response to the unintentional movement of hands holding the camera.

In the camera body is arranged a blurring movement detection unit 6. The unit 6 is constituted from a movement sensor 6a and a sampling circuit 6b for sampling the outputs from the sensor 6a. The sensor 6a comprises a semiconductor acceleration sensor, for instance. The circuit 6b samples the outputs from the sensor 6a at predetermined intervals of time period.

On the other hand, the lens groups 3 and 4 are equipped with a focussing motor 7 and a zooming motor 8 for electrically moving the focus system for focussing operation and the zoom system for zooming operation, respectively. Also, the optical element 5 is equiped with a blurring movement correction actuator 9 for driving the optical element 5 to move in the direction perpendicular to the optical axis (O) or inclined thereto.

Also, the output terminal of the sensor 6a is connected to the input terminal of the circuit 6b. The output terminal of the circuit 6b, that is, the output terminal of the detection unit 6 is connected to the input terminal of a calculation means 10. A memory means 11 is connected to the calculation means 10.

Further, a focus drive circuit 12 is connected to the motor 7, a zoom drive circuit 13 is connected to the motor 8 and an actuator drive circuit 14 is connected to the actuator 9, respectively.

Also, a CPU 15 is arranged for transmitting a command to control each portion installed within the camera body in relation to the other portions. To this CPU 15 is connected an AF circuit 16 which measures the distance to the subject and automatically drives the optical system to become an in-focus state.

Figure 8:
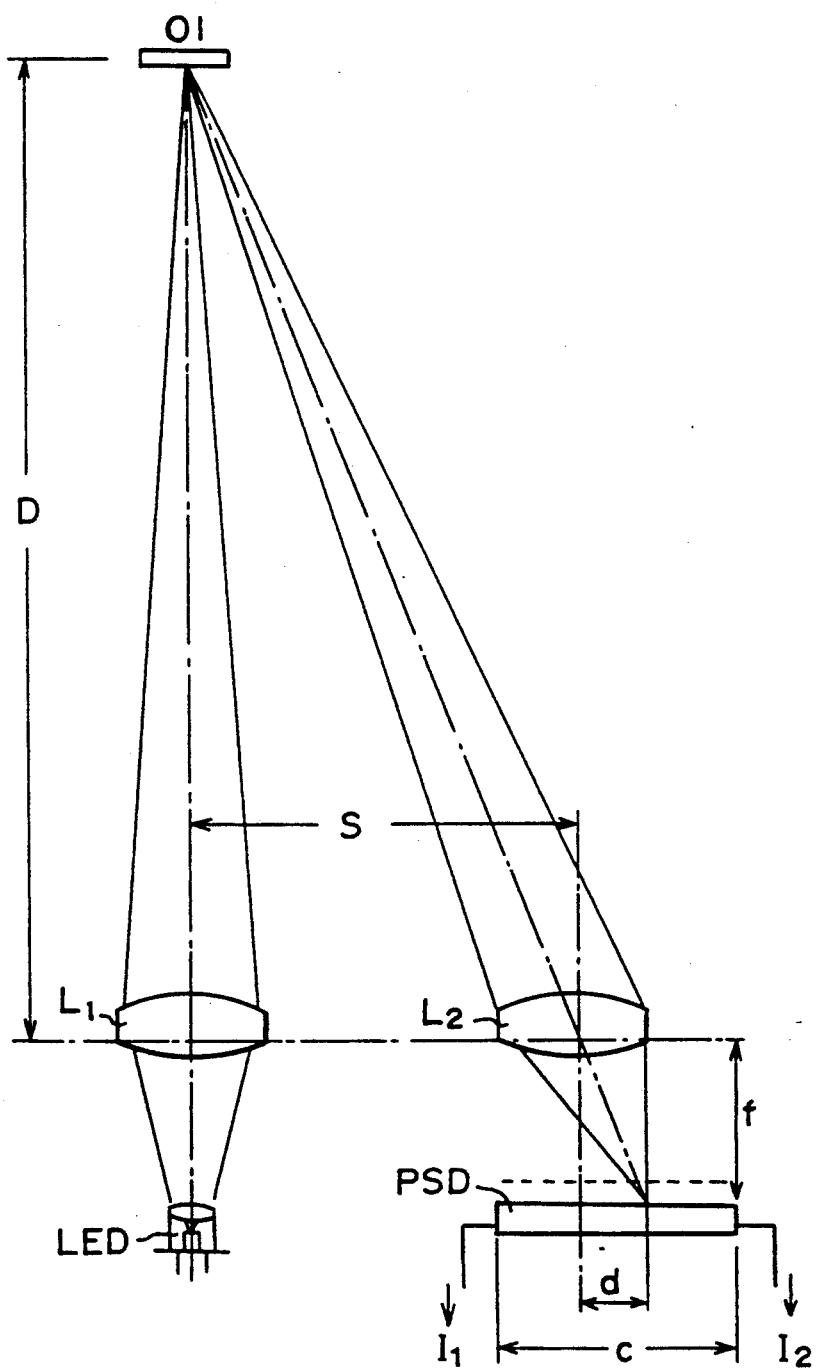
FIG. 8 is an explanatory view for explaining the function of the AF circuit included in the circuit of the first embodiment of FIG. 7.

The AF circuit 16 may comprise an active type structure, as illustrated in FIG. 8, for instance.

More precisely, a laser beam emitted from an infrared spectrum emission diode LED is irradiated through an illumination lens L1 to a subject (an object to be taken as a photograph by the camera) Oj which is positioned at a distance D from the camera body (not shown). A light receiving lens L2 is disposed at a predetermined distance of reference length S from the optical axis of the illumination beam emitted from the LED. The reflection light reflected from the subject Oj is received by a position sensor comprising a PSD (Position Sensitive Device), for instance, through the lens L2.

The sensor PSD is disposed at a distance equal to the focal length of the lens L2 from the lens and has a lateral length of (c).

Therefore, the reflection light reflected from the subject is converged to a spot and forms an image of the subject point at a distance (d) from a reference point of the position sensor PSD.

The sensor PSD generates output signal currents I1 and I2 which are represented, respectively, as follows.

$$I1 \propto (C/2) - d = (C/2) + (f/D)S$$

$$I2 \propto (C/2) + d = (C/2) + (f/D)S$$

Therefore, the following equation is satisfied.

$$\begin{aligned} I2/I1 &= ((C/2) + (f/D)S)/((C/2) - (f/D)S) \\ &= (CD + 2fS)/(CD - 2fS) \end{aligned}$$

This means that the output I2/I1 which corresponds to the reciprocal (1/D) of the distance D to the subject. Thererfore, the data of I2/I1 can be output from the AF circuit 16 as the subject distance data Dx.

The output terminal of the AF circuit 16 which transmits the data Dx of the distance to the subject is connected to a first input terminal of an AF data converter circuit 17. An output terminal of the circuit 17 which outputs the focus drive data Dfx is connected to a first control terminal of the focus drive circuit 12.

To a second control terminal of the circuit 12 is connected an output terminal of a photointerrupter 18 which generates a pulse number data Pix in response to the rotation of the focus motor 7.

On the other hand, the photo-taking optical system 1 is equiped with a zoom position detection circuit 19 which detects the position of the zooming lens group 4 being now positioned for obtaining a zoom position data. Zpx. An output terminal of the circuit 19 which outputs the data Zpx is connected to a second control terminal of the AF data converter circuit 17 and to a first control terminal of the zoom drive circuit 13 as well. To the second control terminal of the circuit 13 is connected an output terminal of the CPU 15 which outputs a zoom drive amount data Z'.

Also, a luminous detection circuit 20 is connected to the CPU 15 so that a desired control of the measurement of the luminous intensity can be achieved. Further, to the input terminals of the CPU 15 are connected a release switch 21 for actuating the release, a luminosity measurement switch 22 for starting the measurement operation of luminous intensity and a zooming switch 23 for starting the zooming operation, respectively.

Further, a feed motor 24 is arranged for driving a series of function of rolling up film and shutter charge.

The rotation of the motor 24 is controlled by a feed command signal transmitted from the CPU 15 through a feed drive circuit 25 which is connected to the output terminal of the CPU 15.

Numeral 26 designates a memory means for temporarily register necessary data for executing a predetermined program by the CPU 15 and other control sequences as well.

The calculation means 10 is essentially constructed from three calculation circuits, i.e., a first circuit 10a, a second circuit 10b and a third circuit 10c, connected in series in this order. The memory means 11 comprises a first memory 11a and a second memory 11b.

The first calculation circuit 10a calculates $V_k = f(V_{k-1}, B_k, B_{k-1})$, wherein $V_k$: velocity data of camera motion at this time of operation $V_{k-1}$: velocity data of camera motion at the time of preceding operation $B_k$: data of movement changing amount at this time of operation $B_{k-1}$: data of movement changing amount at the time of preceding operation.

The second calculation circuit 10b calculates the blurring movement correction drive reference data BLwide on the basis of the data $V_k$ obtained from the first circuit 10a and the distance data Dx output from the AF circuit 16. The drive reference data is represented as follows.

$$BLwide = f(V_k, Dx)$$

The third calculation circuit 10c calculates the blurring movement correction amount data on the basis of the data BLwide obtained from the second circuit 10b and the zoom position data Zpx obtained from the circuit 19. The blurring movement correction amount data is represented as follows.

$$BLzp = f(BLwide, Zpx)$$

On the other hand, the input terminal of the first memory 11a is connected to the output terminal of the sampling circuit 6b, that is, the output terminal of the movement detection unit 6. The output terminal of the first memory 11a is connected to the first input terminal of the first calculation circuit 10a. To the input terminal of the second memory 11b is connected the output terminal of the first calculation circuit 10a. And the output terminal of the second memory 11b is connected to the second input terminal of the first circuit 10a.

Next, the blurring movement correcting function in accordance with the above mentioned structure of the embodiment of the present invention is described hereinafter.

Figure 9:
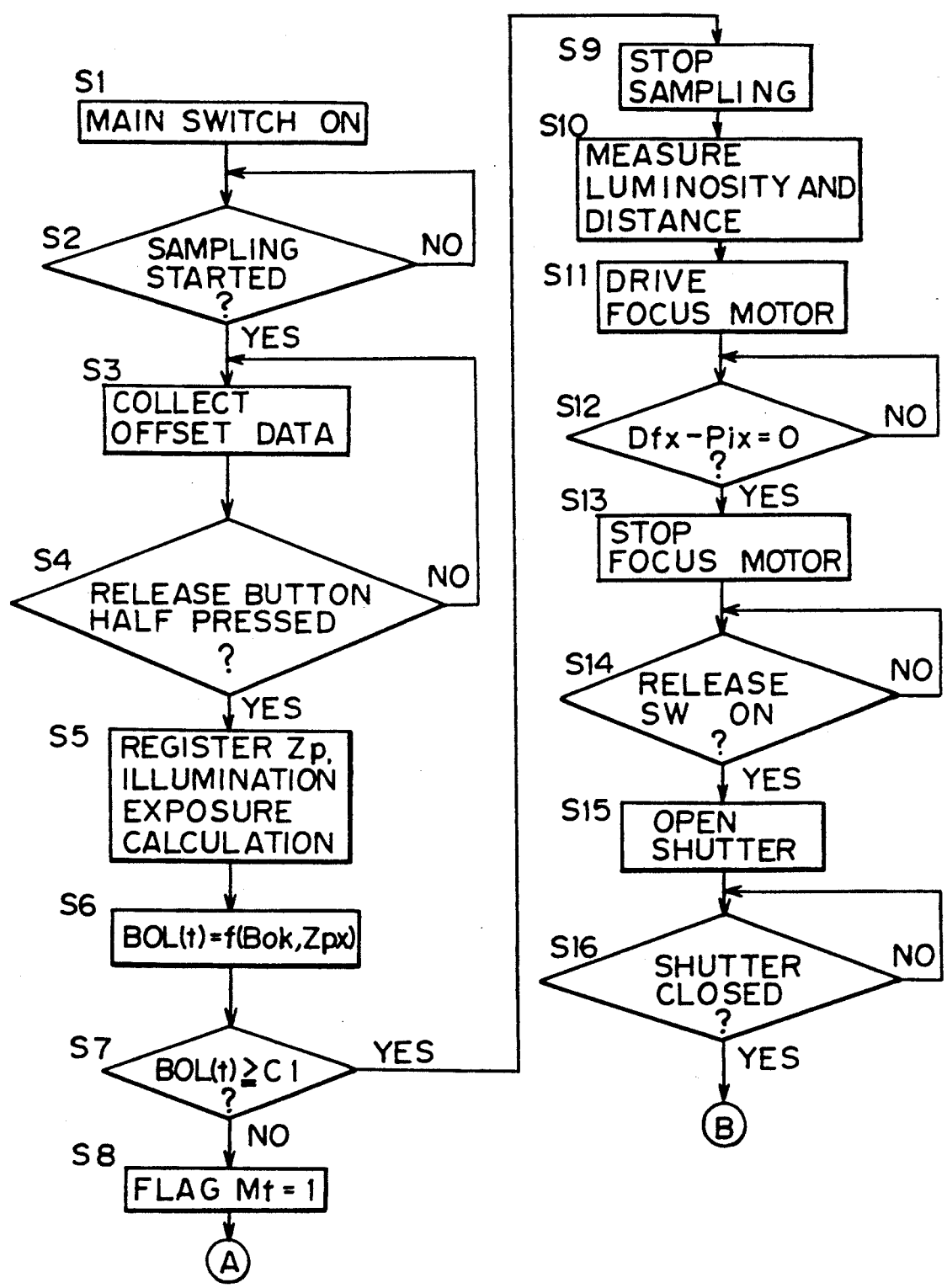
FIG. 9 is a flow chart representing the function of the first embodiment of FIG. 1.

FIG. 9 illustrates a flow chart of the function of the above mentioned embodiment of the present invention.

First, in step S1, a main switch is turned on so that each part of the circuit is supplied with electric power and initialized to be ready for executing a predetermined program registered in the memory 26. Also, a control signal is transmitted from the CPU 15 to the detection unit 6 so that the sensor 6a and the sampling circuit 6b are actuated so that the sampling function for detecting the blurring unintentional movement is started.

In the next step S2, whether the sampling operation is started or not is discriminated. If the discrimination result is NO, the system waits until the sampling operation is started.

It is to be noted that the data $B_k$ output from the unit 6 has a dimension of velocity data obtained by integrating the output $A_k$ of the sensor 6a for a predetermined time period (It) at every sampling interval St.

Figure 11:
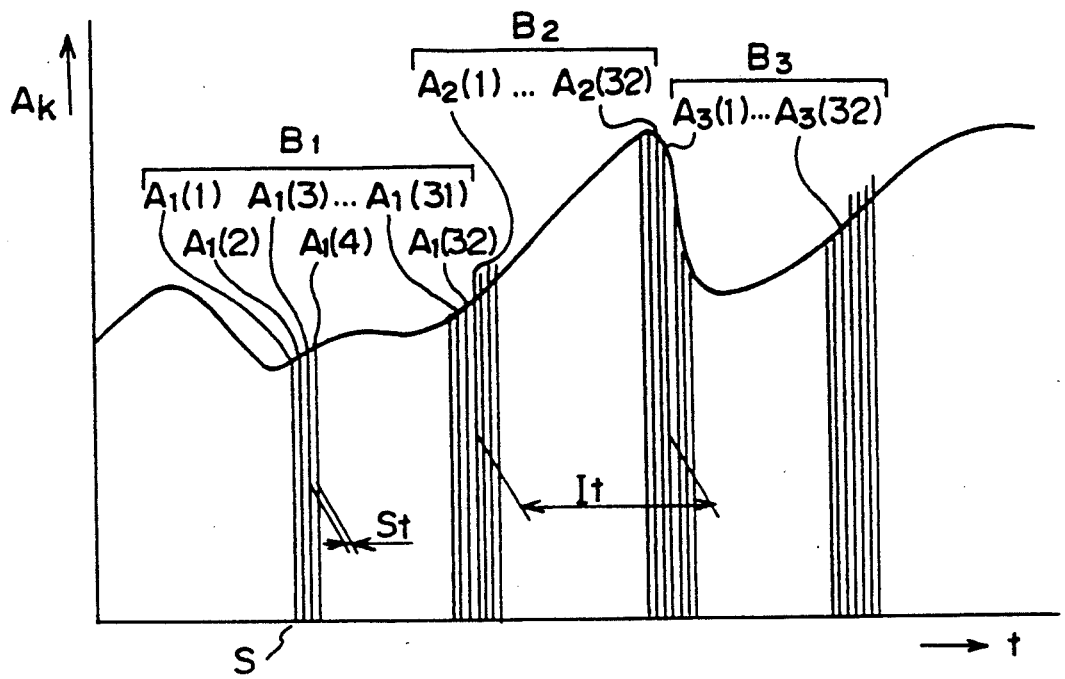
FIG. 11 is a graphical view for explaining the sampling function of the first embodiment of FIG. 7.

This function is graphically represented in FIG. 11. The output $A_k$ from the sensor 6a is sampled n times, for example 32 times, from the starting point S at minute regular sampling intervals St and integrated for a predetermined time period (It) so that the blurring movement changing amount data is obtained as follows.

(1st time data) $B_1 = \sum_{i=1}^{32} A_1(i)$ (2nd time data) $B_2 = \sum_{i=1}^{32} A_2(i)$ (kth time data) $B_k = \sum_{i=1}^{32} A_k(i)$ When such a sampling operation is started and starting of operation is discriminated in step S2, that is, the discrimination result becomes YES in step S2, the flow moves to the subsequent step S3 wherein the offset data are collected.

The reason why the offset data are to be collected is as follows.

The movement changing amount data Bk which corresponds to the unintentional blurring movement of the camera body is obtained from the difference of the movement amount in comparison to the output $A_k$ of the sensor 6a in the condition where the acceleration is zero. Therefore, it becomes necessary to subtract the offset data Boffset represented as follows from each of the plurality of the output data $B_1, B_2, \ldots, B_k$.

(1st time data) $B_1 = \sum_{i=1}^{32} A_1(i) - Boffset$ (2nd time data) $B_2 = \sum_{i=1}^{32} A_2(i) - Boffset$ (kth time data) $B_k = \sum_{i=1}^{32} A_k(i) - Boffset$ The offset data are obtained as mentioned above. After that, the flow moves to the next step S4 wherein whether the release button is half pressed or not is discriminated. If the discrimination result is NO, the flow moves back to step S3. On the other hand, if the discrimination result in step S4 is YES, the flow moves to the next step S5.

In step S5, the zoom position data Zpx obtained from the circuit 19 is registered and the luminosity measurement circuit 20 is driven upon receipt of command from the CPU 15 so that the luminosity measurement and exposure value calculation are started.

After that, in the subsequent step S6, a data BoL(t) for checking the magnitude of the movement is calculated as BoL(t)=f(Bok, Zpx) from the check data Bok and the zoom position data Zpx.

After that, in the next step S7, whether the data BoL(t) is equal to or larger than a predetermined reference data C1 or not is discriminated. If the discrimination result is NO, the flow moves to the subsequent step S8 wherein a flag Mf which represents that the motor 7 is being rotating is set as "1". After that, the flow moves to step S17 and step S44 in the flow chart of FIG. 10 which steps are conducted in parallel to each other simultaneously.

On the other hand, if the discrimination result in step S7 is YES, the situation is considered as that the photographer is intentionally moving the camera body aiming at taking a subject which is moving at a high speed, for instance, since the movement amount is too large to correct. Therefore, in this case, the blurring movement correcting operation is not conducted and the flow moves to step S9.

In step S9, a sampling prohibit signal I is transmitted to the detection unit 6 from the CPU 15 so that the operation of sampling the data is stopped. After that, the flow moves to subsequent step S10 wherein the luminosity and distance are measured to photograph the subject.

In this step, the data Dx of distance to the subject obtained from the AF circuit 16 is input to the AF data converter circuit 17 which calculates the focus drive data Dfx by combining the data Dx and the data Zpx obtained from the zoom position detection circuit 19.

In the next step S11, the focus motor 7 is started to be driven to rotate.

After that, in the next step S12, whether Dfx−Pix=0 or not is discriminated. This discrimination means that at the time of actual focusing drive motion, the data Dfx is compared to the accumulated step number data Pix which is generated from the photo-interrupter 18 each time the motor 7 is driven by one step. That is, whether the motor 7 was driven by the step number necessitated for the focusing motion or not is discriminated in this step S12, more concretely.

If the discrimination result is NO in step S12, the motor 7 is continued to be driven step by step until the discrimination result becomes YES when it is discriminated as that the focusing motion is ended. Then, the motor 7 is stopped in step S13.

In the next step S14, whether the release switch 21 is turned on or not is discriminated. If the discrimination result is NO, the flow waits until the discrimination result becomes YES when the flow moves then to step S15.

In step S15, the shutter is opened so that the film is exposed.

In the next step S16, whether the shutter is closed or not is discriminated. If the discrimination result is NO, the flow waits until the discrimination result becomes YES when the exposure of the film is ended and the flow moves to step S43 represented in the flow chart of FIG. 10.

In step S43, the feed motor 24 is driven through the drive circuit 25 so that the film is advanced and the shutter charging operation is conducted for the next film exposure process.

On the other hand, in the case where the discrimination result in step S7 mentioned above is NO, which means that the amount of the movement of hands is less than a predetermined value, the focus motor flag Mf is set to be "1" in the next step S8.

After that, the flow moves to a first sequence group of steps S17 to S43 and a second sequence group of steps S44 to S48, which first and second sequence groups are conducted in parallel to each other.

The first sequence group is described first. In step S17, the offset data is calculated in such a way that the sampling data are obtained by collecting the offset data obtained in step S3 and that the sampling data are averaged to obtain the offset data Boffset which is the averaged value.

After that, the flow moves to step S18 wherein the value of k and Vo is set as k=1 and Vo=0 wherein k represents the number of times of sampling which is conducted 32 times in total and Vo represents data of the above mentioned camera motion velocity data $V_k$ for the first time of operation.

The reason why the value Vo is set as Vo=0 is that the camera motion velocity data Vk of immediately before the series of the movement detection process for correcting the unintentional movement is started is useless as the reference data for obtaining the data for movement correcting operation since the attitude or direction of the camera and the state of being held by hands are not necessarily the same as those at the time of correcting operation being conducted now.

After that, in the next step S19, the data Ak(1) to Ak(32) are sampled at the 32 points.

In the next step S20, the movement change amount data $B_k$ is calculated from the following equation.

$$B_k = \sum_{i=1}^{32} A_k(i) - B_{offset}$$

Also in step S20, the data $V_k$ is obtained from the following equation.

$$V_k = f(V_{k-1}, B_k, B_{k-1})$$

This calculation is conducted by the first calculation circuit 10a of the calculation means 10. More precisely, the data $V_k$ of this time of operation is calculated first on the basis of the data $B_k$ of this time of operation. The data $B_k$ of this time is registered in the first memory 11a. Also, the data $V_k$ of this time is registered in the second memory 11b.

The data $B_k$ of this time registered in the memory 11a is input to the circuit 10a from the memory 11a as the data $B_{k-1}$ of the preceding time of operation at the time when the data $B_k$ of the next time of operation is transmitted to the circuit 10a from the sampling circuit 6b.

Similarly, with respect to the data $V_k$ of this time of operation registered in the second memory 11b, at the time when the data $B_k$ of the next time is transmitted to the circuit 10a from the sampling circuit 6b, the data Bk of this time is input to the circuit 10a from the memory 11b as the data $V_{k-1}$ of the preceding time Accordingly, it becomes possible to calculate the data $V_k$ which is represented as follows.

$$Vk = f(V_{k-1}, B_k, B_{k-1})$$

After that, in step S21, it is discriminated whether the focus motor flag Mf is "0" which means that the focus motor 7 is being stopped or not. If the motor 7 is being driven, that is, the discrimination result is NO, the flow moves to step S23 wherein the value k is incremented as k=k+1 and the flow moves back to step S19 and after that the steps S19 to S21 are repeated.

In step S21, if the motor 7 is being stopped, that is, the discrimination result is YES, the flow moves to step S22 wherein whether k=kmfs+C2 (kmfs: value of k at the time of ending the AF operation) or not is discriminated.

The reason why the value of k is discriminated is as follows.

The motor 7 is driven until the optical system becomes in-focus. When the system becomes in-focus, the motor 7 is stopped. Immediately after the motor 7 is stopped, there are motion of the camera due to the shock from stopping of the motor and the detector unit 6 detects this motion of the camera and outputs the detection signal of this motion. If such a detection data of motion due to the shock from stopping the motor 7 is used for predictive calculation of the movement correction amount, reliability of the calculation result is lowered. Therefore, the sampling operation has to be started after a predetermined time has passed when such a motion of the camera is attenuated. Therefore, the detecting operation is kept waiting until the value of k becomes larger than the value k at the time when the AF operation is ended by the number C2, for example 5.

Also, if the discrimination result in step S22 is YES, the flow moves to step S24 in which whether the switch 21 is being turned on or not is discriminated.

If the discrimination result in step S24 is NO, the value of k is incremented in step S23 and the steps S19 to S22 are repeated.

On the other hand, if the discrimination result in step S24 is YES, the flow moves to step S25 in which the data BLwide=f($V_k$, Dx) is calculated.

After that, in step S26, the data BLzp=f(BLwide, Zpx) is calculated.

Further, in step S27, the data BLzp is converted to the data BL.

The calculation and conversion processes in the above mentioned steps S25 to S27 are described in more detail below.

First, the relation between the data BLzp output from the calculation means 10 (the third circuit 10c, more precisely) and the focal length of the photo-taking optical system (the data Zpx, more concretely) is such that even if the movement amount of hands is the same, the shift amount of the subject image formed on the film surface becomes large according as the focal length becomes long.

Therefore, on the assumption that the reference zoom position of the photo-taking optical system is arranged in the wide angle side (WIDE) and that the movement correction data at this position is used as the reference movement correction data BLwide, the movement correction amount data BLzp can be represented as follows. BLzp=f(BLwide, Zpx).

It is to be noted that if the data Zpx does not have a linear relation with respect to the actual change of the focal length, the data may be calculated by the approximation method with the use of following equations.

BLzp=BLwide×f(Zpx)

wherein f(Zpx)=a0+a1Zpx or f(Zpx)=a0+a1Zpx+a2Zpx2 wherein a0, a1 and a3 are predetermined constant number.

The data BLwide and the data Vk satisfy the equation BLwide=f($V_k$, Dx) as explained in step S25. The reason why the data Dx is required is explained already with reference to FIG. 6 before. The data Dx is required also in the case where the data Vk is to be converted to the data BLwide. Therefore, the equation BLwide=f($V_k$, Dx) is necessitated as explained in step S25.

It is to be noted that if the data Dx is not linear with respect to the change of distance x2 (see FIG. 6), an approximate calculation is conducted, as in the case for obtaining the data Zpx by calculation of approximation, with the use of the following equations, instead of doing an accurate calculation with the use of complicated calculation circuits which is undesirable.

BLwide=$V_k$×f(Dx)

wherein   f(Dx)=b0+b1Dx   or f(Dx)=b0+b1Dx+b2Dx2 and letters b0, b1 and b2 are predetermined constant numbers.

On the other hand, the data Vk represents the velocity of the image moving on the film surface as mentioned before. If the data Vk is used as it is, the problem of time delay occurs as was described with reference to FIG. 3 before. This can be represented as follows with the use of equations.

$$B_k = \sum_{i=1}^{k} Bi$$

or $$V_k = f(V_{k-1}, B_k) = (V_{k-1}) + B_k$$

Figure 12:
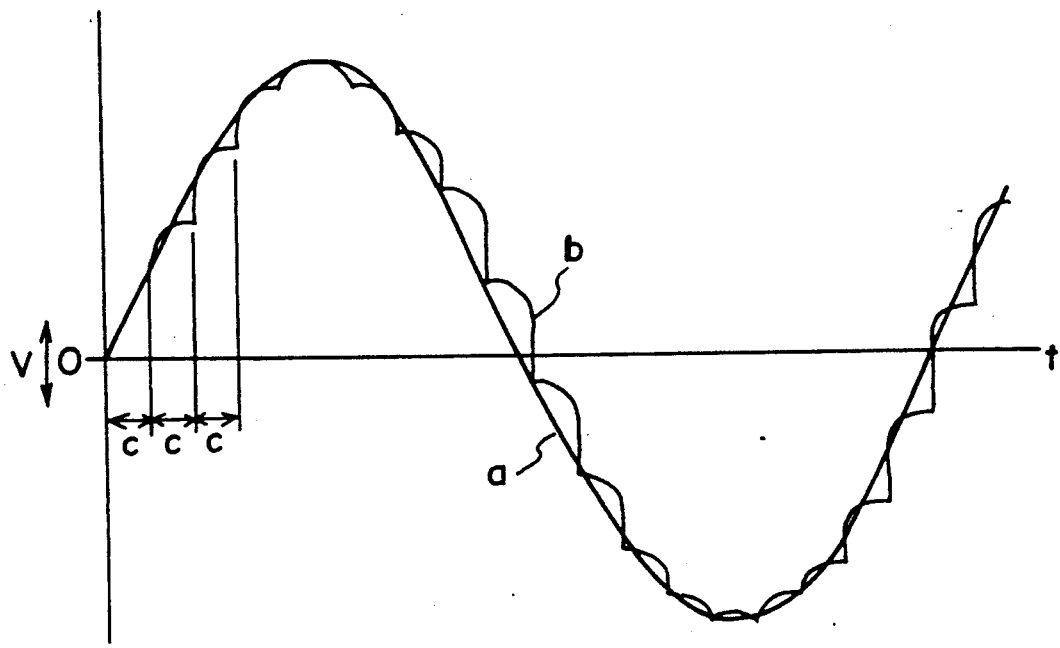
FIG. 12 is a graphical view for explaining the state of movement correcting operation according to the first embodiment of FIG. 7.

The calculation means 10 predictively calculates the correcting amount of movement of the camera due to the unintentional motion of hands on the basis of data $B_k$, $B_{k-1}$ and $V_{k-1}$. More concretely, in this particular embodiment, if the state of movement is represented by an approximate sine curve as illustrated in FIG. 12 by characteristic line (a), the movement correction characteristic curve following the movement of curve (a) is represented by line (b) in FIG. 12.

Figure 13:
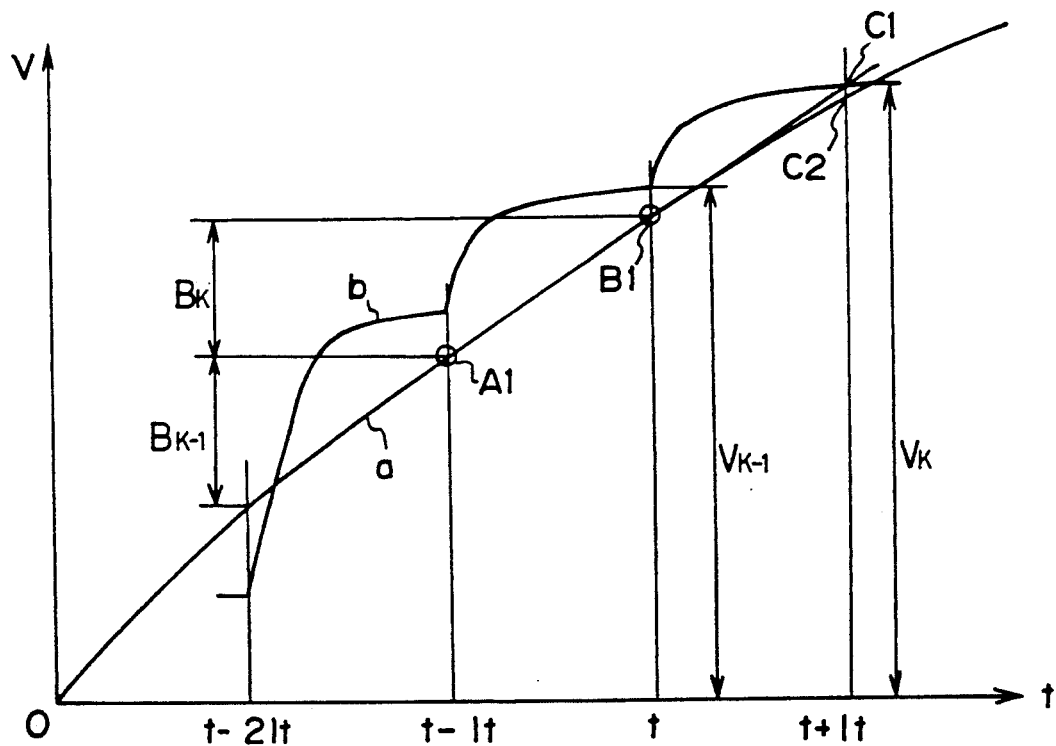
FIG. 13 is a partial enlarged view of the graph of FIG. 12.

More precisely, as illustrated by enlarged graph in FIG. 13, the velocity at the point C2 is predicted from the velocity data at the points B1 and A1 by linear approximation method wherein the timings of the points A1, B1 and C2 are represented by t−It, t and t+It, respectively, wherein It represents the integration time for one integration calculation.

It is to be noted that it is desirable that the points C1 and C2 be completely coincident to each other. However, slight difference is inevitably generated between the points C1 and C2 since the predictive calculation is conducted on the basis of linear approximation while the actual velocity change is represented by the sine curve (a). However, the difference is practically negligible and no problem arises.

The data Vk at the timing point t+It to be predicted is represented as follows.

$$Vk = f(Vk-1, Bk, Bk-1)$$

or otherwise by $$Vk = V_{k-1} + 2B_k - B_{k-1}$$

Therefore, the data BLzp obtained in step S26 is converted to the data BL in the next step S27.

More concretely, such a conversion is conducted by the actuator drive circuit 14. The data BL is calculated in such a way that a plurality of the data $B_k$ output from the detection unit 6 are obtained first and that the predictive amount of movement correction at the timing of prediction point (which is the timing after the integration period It, in this particular embodiment) is calculated on the basis of the plurality of the data Bk. Therefore, the data BL corresponds to the amount of movement correction at the prediction point. Accordingly, to correct the movement at the prediction point, the data BLzp is converted to the data BL by reversing the phase of the data so that the movement of hands is cancelled.

That is, in step S27, the data BLzp is converted to the data BL, then in step S28, the actuator 9 is driven to move the element 5 in the direction perpendicular to the optical axis (0) so that the movement is predictively corrected.

After that, in step S29, the shutter is opened. Then, in step S30, the sampling interval time (It) is subtracted from the shutter time period Ss. After that, in step S31, whether the subtracted time Ss is below zero or not. If the discrimination result is NO, the sampling number k is incremented in step S32 so that the sampling operation is conducted again.

After that, steps S33 to S38 are conducted in a manner similar to the steps S19, S20, S25, S26, S27 and S28, mentioned above. In step S38, the movement correction actuator is driven. After that, the flow moves back to step S30. In step S30, the time Ss is obtained by subtracting the sampling interval time (It) from the shutter time. After that, in step S31, whether the time Ss is below zero or not is discriminated. If the discrimination result is NO, the steps S32 to S38 are repeated as mentioned above.

Steps S32 to S38 are repeated until the discrimination result in step S31 becomes YES, that is, the time Ss becomes larger than or equal to zero. This means that while the shutter is being opened, the predictive movement correction is repeatedly conducted on the basis of movement detection data.

If the discrimination result in step S31 becomes YES, the flow moves to step S39 wherein whether the shutter is closed or not is discriminated. If the discrimination result in step S39 is NO, the step S39 is conducted again, which means that the flow waits until the discrimination result becomes YES.

When the discrimination result becomes YES in step S39, the flow moves to step S40 wherein the actuator 9 is driven in the direction opposite to the movement correcting direction so that the actuator returns to the initial position.

After that, in step S41, the CPU 15 outputs an inhibit signal I so that the function of the actuator drive circuit 14 is stopped and the actuator 9 is deenergized and stopped, accordingly.

After that, in step S42, in a similar manner to the case of step S41 mentioned above, the CPU 15 outputs the inhibit signal I to stop the operation of the circuit 6b of the unit 6 so that the sampling operation is stopped.

After that, the flow moves to step S43 wherein the film is advanced and the shutter charge operation is conducted for the next photographing process. Thereby, a series of the function of the first sequence group is ended.

On the other hand, the function of the second sequence group is as follows.

Figure 10:
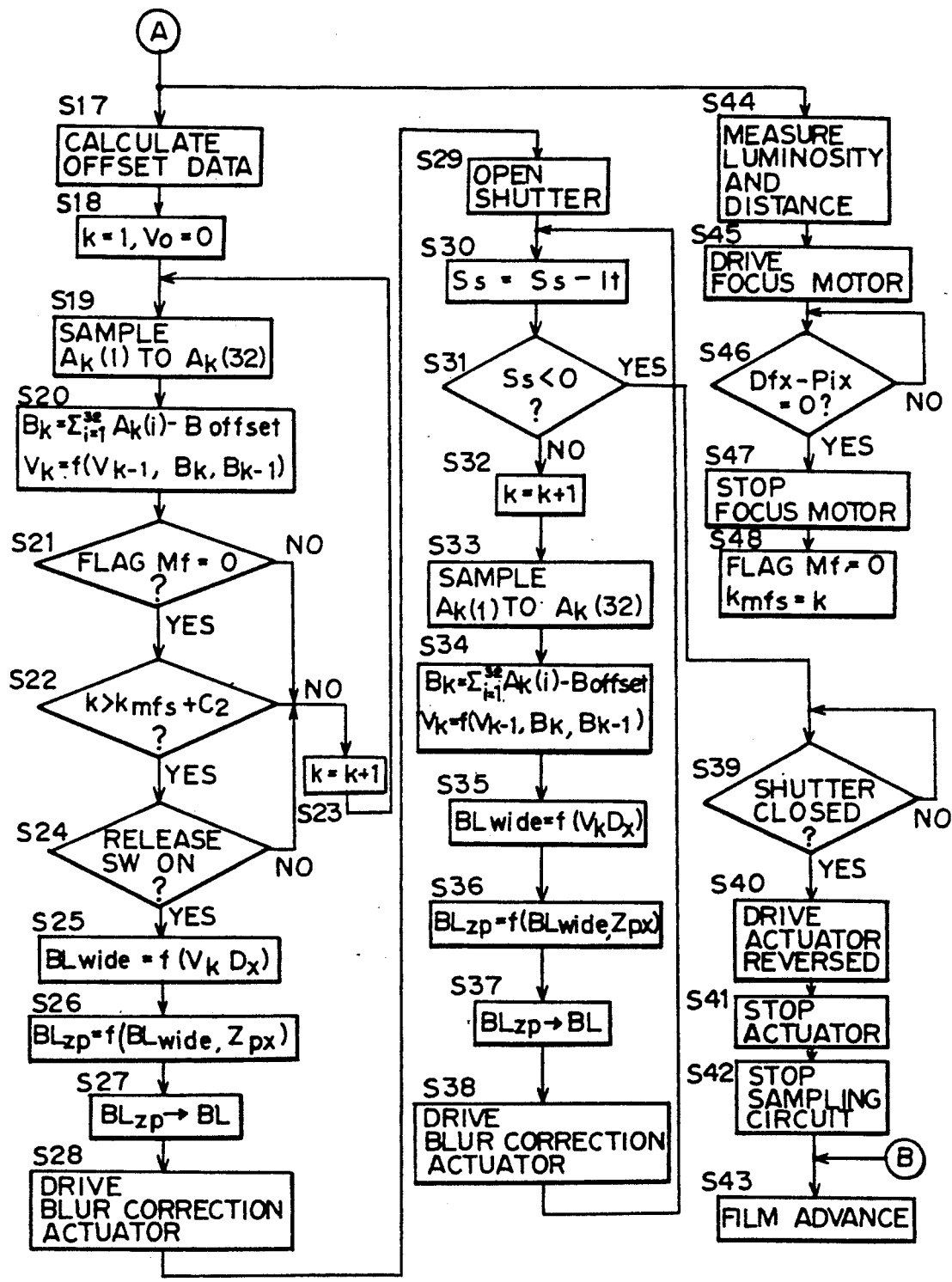
FIG. 10 is a flow chart of the function of the first embodiment continued from the flow chart of FIG. 9.

When the flag Mf becomes "1" in step S8 of FIG. 9, the flow moves to step S44 of FIG. 10 wherein the circuit 20 starts the luminosity measuring operation under the control of the CPU 15 upon the receipt of command signal from the CPU 15. The shutter speed and the value of aperture are determined in response to the adequate exposure value obtained on the basis of the measurement result of luminosity.

Simultaneously with the above mentioned function in step S44, the circuit 16 is actuated by the command from the CPU 15 and conducts the distance measurement operation under the control of the CPU 15. The distance data Dx obtained in this measurement operation is converted to the focus data Dfx by the circuit 17.

After that, the flow moves to step S45 wherein the focusing operation is conducted on the basis of the focus data Dfx.

After that, the flow moves to step S46 wherein whether $Dfx - Pix = 0$ or not is discriminated. More precisely, this step is to discriminate whether the focus data Dfx which corresponds to the step number of the motor 7 necessitated for actual focusing motion and the accumulated step number data Pix generated from the photointerrupter 18 each time the motor 7 is driven by one step are equal to each other or not. That is, whether the motor 7 has been yet driven by the step number needed to complete the focus motion is discriminated in this step S46.

If the discrimination result is NO in step S46, the motor 7 is continued to be driven step by step until the step number becomes equal to the number needed to achieve the focus motion.

When the discrimination result becomes YES in step S46, the flow moves to step S47 wherein the motor 7 is stopped.

After that, in step S48, the motor flag Mf is turned to "0" which represents that the motor 7 is being stopped. Also, at the same time, the value of k at the time of ending the AF operation is set in k as $k_{mfs}$ so that the above mentioned process of the first sequence group is conducted in parallel together for preparation for the blurring movement correction and film exposure.

Therefore, in accordance with the first embodiment mentioned above, the unintentional movement of the camera body is detected at a predetermined time interval (sampling interval It) so that the movement is predictively calculated on the basis of data $B_k$, $B_{k-1}$ and $V_{k-1}$ in such a way that the unintentional vibration movement is assumed to be of approximate sine curve as represented by the characteristic curve (a) in FIGS. 12 and 13 and that the movement amount at the timing point $(t + It)$ is predictively calculated on the basis of the data at the timing points (t) and $(t - It)$ by a linear approximation method, which makes it possible to predict the movement amount and correct or cancel the movement.

Figure 14:
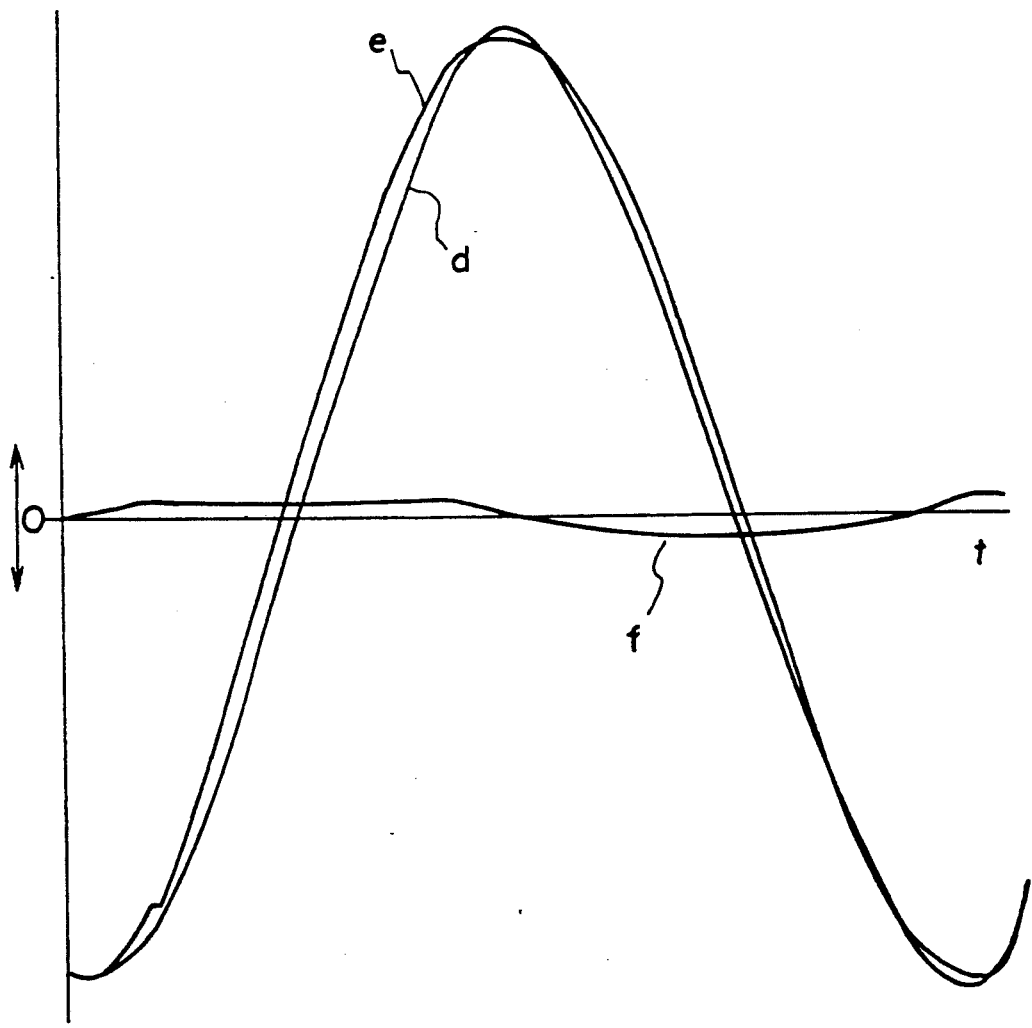
FIG. 14 is an explanatory view representing the movement amount of camera after the movement of hands is corrected according to the first embodiment of FIG. 7.

Therefore, with respect to the image motion on the film surface, the sine curve of the correcting amount characteristic (d) becomes almost equal to the movement characteristic (e), as illustrated in FIG. 14, so that there is very slight deficiency of correction amount as represented by the characteristic line (f) which is practically negligible and involves in no problems in actual operation.

Also, the blurring movement correction amount is corrected on the basis of the zoom position data Zpx as a result of which it becomes possible to accurately correct the unintentional blurring movement at any focal length position.

Further, the movement correction amount is corrected on the basis of the subject distance data Dx as a result of which it becomes possible to accurately correct the unintentional blurring movement at any subject distance from close position to the infinite position.

In accordance with the embodiment of the present invention mentioned above, the predictive movement calculation to cancel the unintentional movement of camera is conducted on the basis of three data, that is, the movement changing amount data $B_k$ of this time, the movement changing amount data $B_{k-1}$ of the preceding time and the velocity data $V_{k-1}$ of the camera motion of the preceding time, as a result of which it becomes possible to accurately follow the actual unintentional motion of the camera and correct the motion accordingly.

Next, the second embodiment of the present invention is described hereinafter. This embodiment is adequately applied to the case where the correction condition is more severe such as the case wherein the telescopic lens having a relatively long focal length is used so that the movement has to be corrected more reliably and accurately.

The second embodiment is described below with reference to FIGS. 15 to 18.

Figure 15:
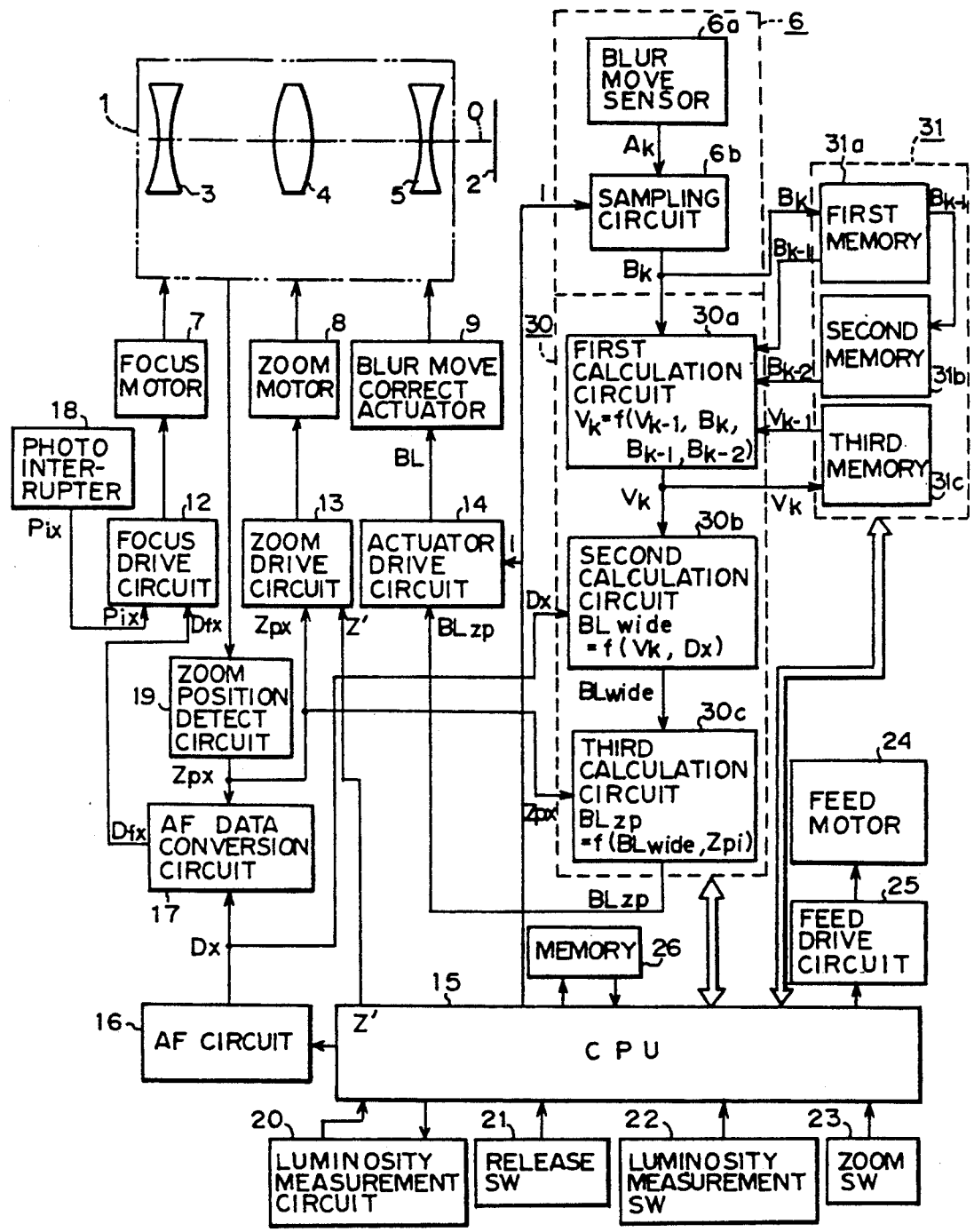
FIG. 15 is a block diagram of the electric circuit structure in accordance with a second embodiment of the present invention.

FIG. 15 illustrates the circuit structure of the second embodiment of the present invention. The structure of FIG. 15 differs from the structure of FIG. 7 only in that the arrangement of the calculation means 30 and memory means 31 is different from those of FIG. 7. The same or corresponding parts are designated by the same numerals as the embodiment of FIG. 7.

The essential structure of the means 30 is constituted from a first calculation circuit 30a, a second calculation circuit 30b and a third calculation circuit 30c connected together in series in this order. The memory means 31 comprises a first memory 31a, a second memory 31b and a third memory 31c.

The first circuit 30a is arranged to obtain $$V_k = f(V_{k-1}, B_k, B_{k-1}, B_{k-2})$$

wherein
- $V_k$: camera motion velocity data of this time of operation
- $V_{k-1}$: camera motion velocity data of preceding time of operation
- $B_k$: movement changing amount data of this time of operation
- $B_{k-1}$: movement changing amount data of preceding time of operation
- $B_{k-2}$: movement changing amount data of preceding time of preceding time.

The second circuit 30b and the third circuit 30c are substantially the same as the second circuit 10b and the third circuit 10c of the first embodiment of FIG. 7, respectively.

On the other hand, to the input terminal of the memory 31a is connected an output terminal of the sampling circuit 6b of the detection unit 6. The output terminal of the memory 31a is connected to the input terminal of the circuit 30a.

Further, the output terminal of the memory 31a is connected to the input terminal of the memory 31b. The output terminal of the memory 31b is connected to the input terminal of the circuit 30a. Also, to the input terminal of the third memory 31c is connected the output terminal of the first circuit 30a. The output terminal of the memory 31c is connected to the input terminal of the input terminal of the circuit 30a.

It is to be noted that in accordance with the first embodiment of FIG. 7, the first memory 11a for memorizing the data $B_{k-1}$ is used as the first memory means and the second memory 11b for memorizing the data $V_{k-1}$ is used as the second memory means. However, in accordance with the embodiment of FIG. 15, the first memory means is constituted from the first and second memories 31a and 31b combined together, for memorizing the data $B_{k-1}$ and $B_{k-2}$, respectively. The second memory means of this embodiment is constituted from the third memory 31c for memorizing the data $V_{k-1}$.

The blurring movement correcting function of the above mentioned structure of the second embodiment of the present invention is described below.

Figure 16:
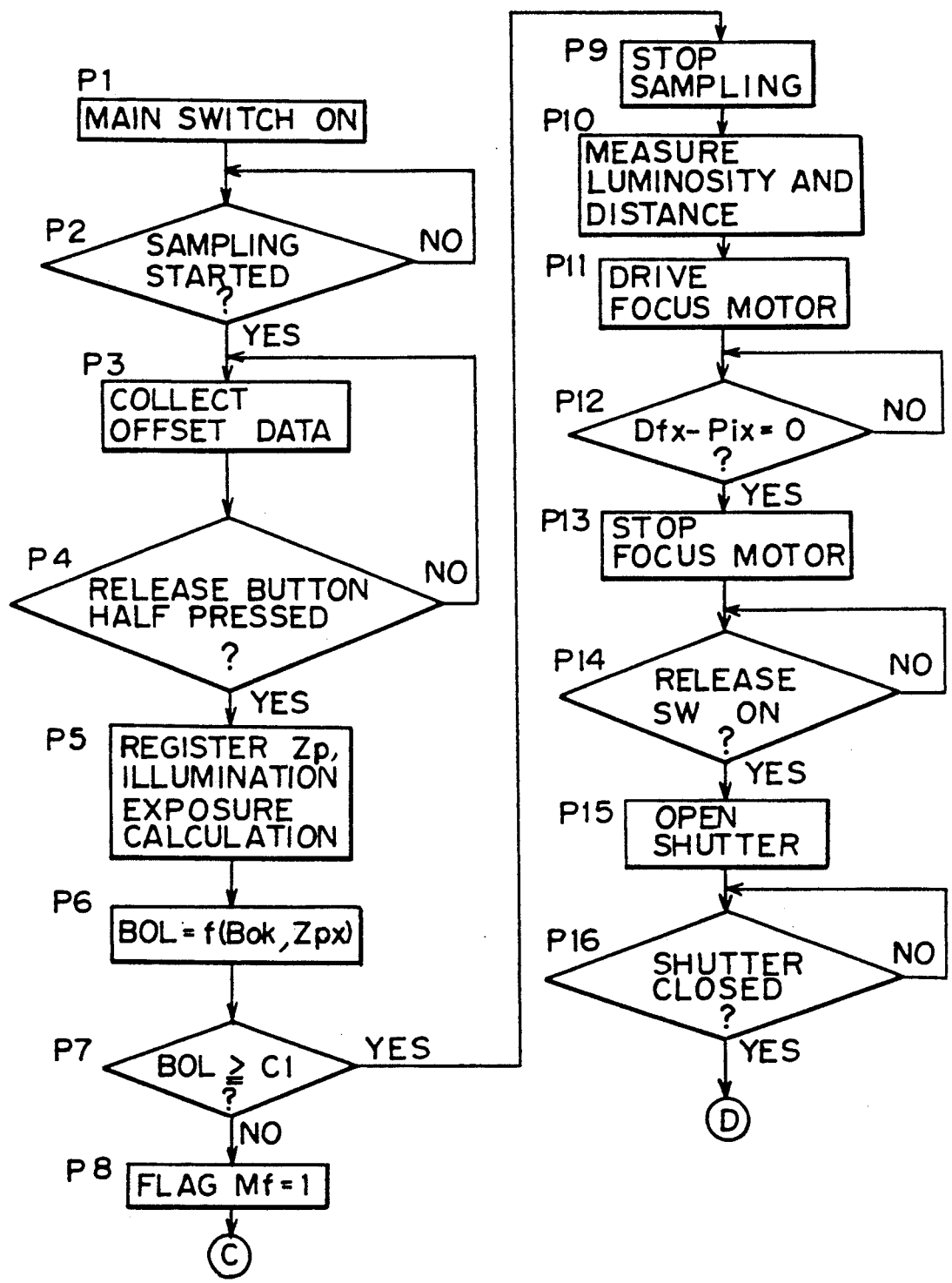
FIG. 16 is a flow chart of the function of the second embodiment of the present invention.
Figure 17:
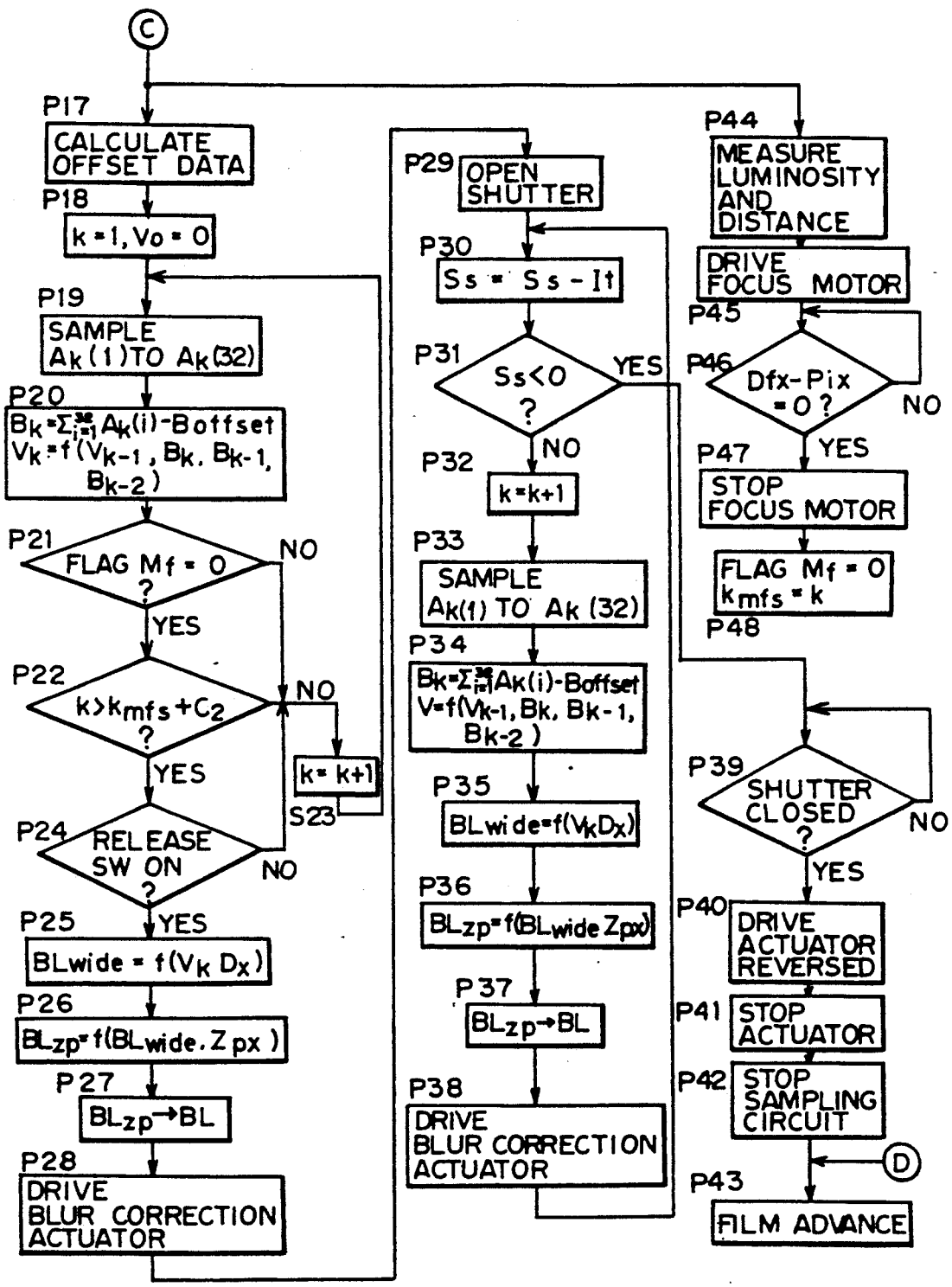
FIG. 17 is a flow chart of the second embodiment of the present invention continued from the flow chart of FIG. 16.

FIGS. 16 and 17 illustrate flow charts of the function of the second embodiment of the present invention. There are many steps which are the same as those of the first embodiment represented in the flow charts of FIGS. 9 and 10. Therefore, only the steps which are different from those of the first embodiment are described hereinafter for the sake of clarifying the explanation.

In FIGS. 16 and 17, steps P1 to P19 and steps P44 to P48 are substantially the same as steps S1 to S19 and steps S44 to S48. Therefore, after steps P1 to P19 are conducted in the same manner as the first embodiment mentioned above, the flow moves to step P20.

In step P20, the movement change amount data Bk and the velocity data Vk of the camera motion is obtained by the sampling circuit 6b using the following equation.

$$B_k = \sum_{i=1}^{32} A_k(i) - B\text{offset}$$

Also, the data $V_k$ is calculated by the circuit 30a from the following equation.

$$Vk = f(V_{k-1}, B_k, B_{k-1}, B_{k-2})$$

More precisely, the data $V_k$ of this time of operation is calculated on the basis of the data Bk of this time of operation. The data $B_k$ of this time is registered in the first memory 31a. Also, the data $V_k$ is registered in the third memory 31c. The data Bk registered in the memory 31a is, when the data $B_k$ of next time is transmitted from the circuit 6b to the calculation circuit 30a, input to the memory 31b from the memory 31a as the data Bk−1 of the preceding time. The data Bk of this time is also input to the calculation circuit 30a as well.

Also, the data $B_{k-1}$ of preceding time registered in the memory 31b is input to the circuit 30a from the memory 31b as the data $B_{k-2}$ of preceding time of preceding operation when the data Bk is transmitted to the circuit 30a from the circuit 6b.

Further, the data $V_k$ of this time registered in the memory 31c is input to the circuit 30a from the memory 31c as the data $V_{k-1}$ of preceding time when the data $B_k$ for the next time is transmitted from the sampling circuit 6b to the calculation circuit 30a. Therefore, it becomes possible to calculate the data $V_k = f(V_{k-1}, B_k, B_{k-1}, B_{k-2})$.

After that, in step P21, whether the focus flag Mf is being "0", which means the focus motor 7 is being stopped, or not is discriminated. The sequence of function of this step P21 and the series of steps P22 to P33 following to step P21 is the same as the sequence of function of steps S21 to S33 of the first embodiment mentioned above and referring to FIG. 10.

After step P33 is ended, the flow moves to step P34 wherein the operation is conducted in the same way as the above mentioned step P20. After that, steps P35 to P38 are conducted in substantially the same manner as steps P25 to P28.

On the other hand, the discrimination result of "Ss<0 ?" in step P31 becomes YES, the flow moves to step P39 wherein whether the shutter is being closed or not is discriminated. If the discrimination result in step P39 is NO, the flow repeats the step P39 so that the flow waits until the discrimination result becomes YES. When the discrimination result becomes YES, the flow moves to step P40.

In step P40, the blurring movement correcting actuator 9 is driven to move to the direction opposite to the direction for correcting the blurring movement, that is, the actuator 9 returns to the initial position.

After that, in step P41, the CPU 15 outputs an inhibit signal I to stop the function of the drive circuit 14 so that the actuator 9 is stopped.

After that, in step P42, as in the case of step S42 of FIG. 10 mentioned before, the function of the sampling circuit 6b of the movement detection unit 6 is stopped by the inhibit signal I transmitted from the CPU 15.

After that, the flow moves to step P43 wherein the film is advanced and the shutter charge operation is conducted for preparation for the next photographing process. Thereby, a series of blurring movement prediction and correction sequence is ended in the first sequence group of steps.

On the other hand, with respect to the function of the second sequence group of steps, steps P9 to P16 are conducted in substantially the same way as the aforementioned steps S9 to S16 of the first embodiment of the present invention.

Figure 18:
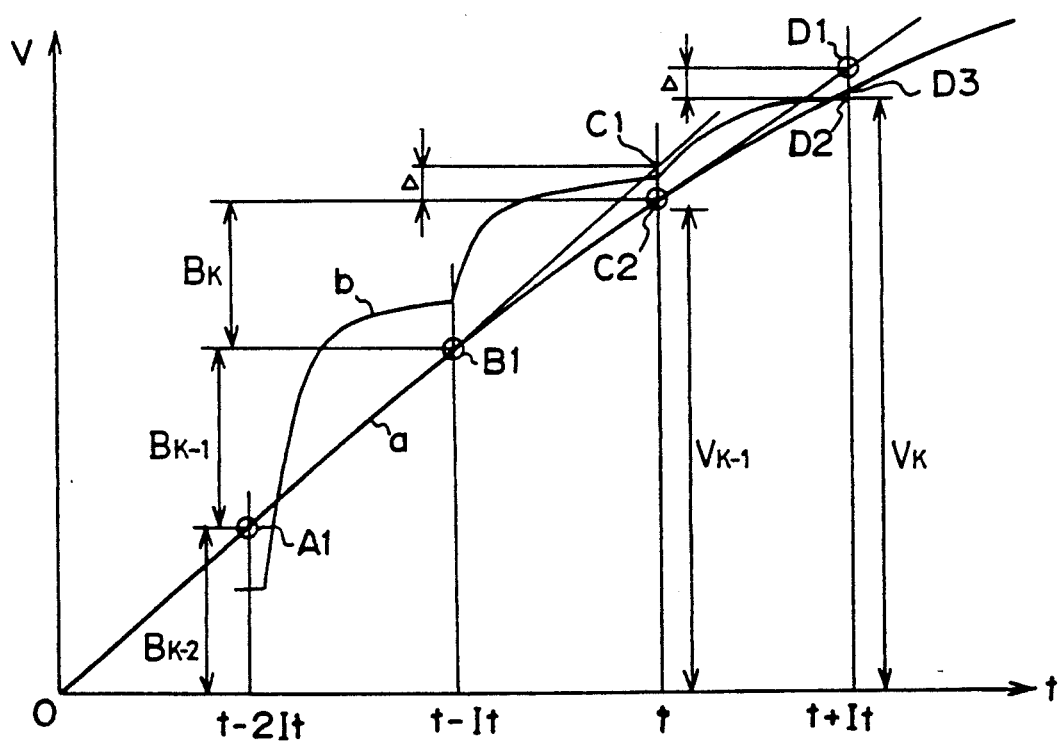
FIG. 18 is an explanatory view for explaining the state of operating the movement correcting means according to the second embodiment of the present invention.

Therefore, in accordance with the second embodiment of the present invention, the blurring movement is predictively calculated in such a way that the unintentional movement of hands is detected at a predetermined time interval (sampling interval (It)) and that the predictive amount of movement is calculated on the basis of four data, that is, $B_k$, $B_{k-1}$, $B_{k-2}$ and $V_{k-1}$. If the blurring vibration movement is represented approximately by a sine curve characteristic (a) as illustrated in FIG. 18, the movement correction characteristic curve which follows the actual movement is represented by the line (b) in FIG. 18.

The velocity of the movement at the point D3 at the timing point (t+It), that is, the timing after time (It) has elapsed from the time (t) now is predictively calculated with the use of curve approximation method on the basis of the velocity data at the point C2 at the time (t) now, the velocity data at the point B1 at the timing (t−It), and the velocity data at the point A1 at the timing (t−2It).

That is, the velocity C1 at the timing (t) is obtained from the data at the timing points (t−2It) and (t−It). The difference Δ between the velocity C1 and the actual velocity (velocity at the point C2) is represented as $$\Delta = B_{k-1} - B_k.$$

In other words, the data at the point D1 is obtained from the data at the points B1 and C2. The value of Δ is subtracted from the data at the point D1 to calculate the data at the point D2. This data at the point D2 is supposed to be the predictive velocity data at the timing point (t+It) after time (It) has elapsed from the time (t) now. This is represented by the equations as follows.

$$V_k = f(V_{k-1}, B_k, B_{k-1}, B_{k-2})$$

or otherwise, $$V_k = V_{k-1} + 3B_k - 3B_{k-1} + B_{k-2}.$$

That is, the data $V_{k-1}$ at the timing point (t−It) and the data at the timing points (t−It) and (t−2It) are temporarily registered in the memories 31a and 31b. The data $V_k$ is calculated from the registered data and the data $B_k$ at the timing point (t). And on the basis of the data $V_k$, the data $B_k$ at the timing point (t+It) is predictively calculated by the so called curve approximation method.

Therefore, in accordance with the second embodiment of the present invention mentioned above, the blurring movement can be corrected more accurately and at a higher speed than in the case of the first embodiment, which makes it possible to use a telescopic lens attached to the hand-held camera to take a telescopic photograph, which has been supposed to be impossible in accordance with the prior art.

The present invention is not limited to the embodiments mentioned above. The present invention can be applied to various variants of the embodiment within the scope of the invention.

For example, the blurring movement correction element may be constituted from a wedge shaped prism disposed perpendicular to the optical axis so that the prism is vertically moved to correct the blurring movement of the camera.

Also, in accordance with the embodiments of the present invention, a plurality data are used for predicting the velocity of the blurring movement. That is, in the first embodiment, data at two timing points are used to calculate the predictive movement while in the second embodiment, data at three timing points are used to calculate the predictive movement. The number of the timing points for obtaining the data to be uses for predictive calculation may be determined considering the interval between measurements, required accuracy for correcting the blurring movement, and cost for producing the camera, etc.

Also, in accordance with the first and second embodiments of the present invention mentioned above, the blurring movement is detected in such a way that the acceleration generated in the camera body is detected and integrated for a predetermined integration time by the sensor 6a composed of a semiconductor acceleration sensor and a sampling circuit 6b. However, the present invention is not limited to such an arrangement. A gyro-type acceleration sensor may be used instead. That is, any means which is able to output an electric signal corresponding to the movement of the camera body.

Also, the present invention can be applied not only to the camera equipped with a zoom lens as the photographing lens as in the case of the first and second embodiments but to the camera equipped with a fixed focal length lens as well.

It is also to be noted that in accordance with the first and second embodiments of the present invention mentioned above, the blurring movement is corrected at the zoom position being now on set arranging the focal length of most wide angle side of the photo-taking optical system to be used as the reference for obtaining the data for calculation. However, instead of the arrangement mentioned above, the reference point may be set in the telescopic side or somewhere in between.

Also, in accordance with the above mentioned embodiments of the present invention, the zoom position data is obtained by detecting the shifting motion of the zoom lens system. However, the zoom position may be obtained by detecting the shift motion of the movement correction optical element instead.

Further, a variably focal lens system or a double or multi-focal-length lens system which is able to change the focal length steppingly rather than continuously may be adopted as the variable focal length photographing optical system, instead of the zoom lens system as in the case of the first and second embodiments of the present invention mentioned above.

Also, the blurring movement correction optical element may be formed as a part of or whole of the focusing lens system or the zoom lens system. Also, the focus lens system and the zoom lens system may be assembled together instead of being arranged independently.

Also, it is design choice to correct the blurring movement correction amount according to the length to the subject or the focal length.

Further, in accordance with the above mentioned embodiments of the present invention, the data of distance to the subject is obtained for the entire range from the close position to the infinite position continuously. However, instead of such an arrangement, the subject distance data may be obtained from a plurality of points steppingly between the close position and the infinite position.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera having blurring movement correction mechanism comprising:
    a blurring movement correction optical element disposed in an optical path of a photo-taking optical system so as to correct shift of an image formed on a film surface caused by movement of hands holding a camera body;
    a blurring movement correction actuator for moving said optical element in a necessary direction for correcting said shift of the image on the film surface;
    a blurring movement detection unit for obtaining a blurring movement detection data by converting said blurring movement of said camera body to an electric signal;
    a first memory means for temporarily registering said detection data output from said detection unit;
    a calculation means for calculating blurring movement correction data for correcting said shift of the image formed on the film surface caused by movement of hands holding the camera body by actuating said optical element by said actuator; and
    a second memory means for temporarily registering an output data of calculation from said calculation means,
    said calculation means being so constructed that said blurring movement correction data is predictively calculated on the basis of said detection data of this time obtained from said detection unit, said detection data of the preceding time registered in said first memory means and said correction data of the preceding time registered in said second memory means so as to correct said shift of the image formed on the film surface by actuating said optical element by said actuator.

2. A camera having blurring movement correction mechanism comprising:
    a blurring movement correction optical element disposed in an optical path of a photo-taking optical system so as to correct shift of an image formed on a film surface caused by movement of hands holding a camera body;
    a blurring movement correction actuator for moving said optical element in a necessary direction for correcting said shift of the image on the film surface;
    a blurring movement detection unit for obtaining a blurring movement detection data by converting said blurring movement of said camera body to an electric signal;
    a first memory means for temporarily registering said detection data output from said detection unit;
    a calculation means for calculating blurring movement correction data for correcting said shift of the image formed on the film surface caused by movement of hands holding the camera body by actuating said optical element by said actuator; and
    a second memory means for temporarily registering an output data of calculation from said calculation means,
    said calculation means being so constructed that said blurring movement correction data is predictively calculated on the basis of said detection data of this time obtained from said detection unit, said detection data of the preceding time and the preceding time of the preceding time registered in said first memory means and said correction data of the preceding time registered in said second memory means so as to correct said shift of the image formed on the film surface by actuating said optical element by said actuator next time.

3. A camera having blurring movement correction mechanism according to claim 1, wherein said detection unit is so constructed that acceleration generated in the camera body is detected and that the detected data are integrated for a predetermined integration time so as to generate said blurring movement detection data.

4. A camera having blurring movement correction mechanism according to claim 2, wherein said detection unit is so constructed that acceleration generated in the camera body is detected and that the detected data are integrated for a predetermined integration time so as to generate said blurring movement detection data.

5. A camera having blurring movement correction mechanism comprising:
    a blurring movement correction optical element disposed in an optical path of a variable focal length photo-taking optical system so as to correct shift of an image formed on a film surface caused by movement of hands holding a camera body;
    a blurring movement correction actuator for moving said optical element in a necessary direction for correcting said shift of the image on the film surface;
a blurring movement detection unit for obtaining a blurring movement detection data by converting said blurring movement of said camera body to an electric signal;
a first memory means for temporarily registering said detection data output from said detection unit;
a zoom position detection means for obtaining a zoom position data by detecting focal length of said photo-taking optical system;
a calculation means for calculating blurring movement correction data for correcting said shift of the image formed on the film surface caused by movement of hands holding the camera body by actuating said optical element by said actuator; and
a second memory means for temporarily registering an output data of calculation from said calculation means,
said calculation means being so constructed that said blurring movement correction data is predictively calculated on the basis of said detection data of this time obtained from said detection unit, said detection data of the preceding time registered in said first memory means and said correction data of the preceding time registered in said second memory means so as to correct said shift of the image formed on the film surface by actuating said optical element by said actuator and as well that said correction data is corrected on the basis of the focal length in response to said zoom position detection data obtained from said zoom position detection means.

6. A camera having blurring movement correction mechanism comprising:
a blurring movement correction optical element disposed in an optical path of a variable focal length photo-taking optical system so as to correct shift of an image formed on a film surface caused by movement of hands holding a camera body;
a blurring movement correction actuator for moving said optical element in a necessary direction for correcting said shift of the image on the film surface;
a blurring movement detection unit for obtaining a blurring movement detection data by converting said blurring movement of said camera body to an electric signal;
a first memory means for temporarily registering said detection data output from said detection unit;
a zoom position detection means for obtaining a zoom position data by detecting focal length of said photo-taking optical system;
a calculation means for calculating blurring movement correction data for correcting said shift of the image formed on the film surface caused by movement of hands holding the camera body by actuating said optical element by said actuator; and
a second memory means for temporarily registering an output data of calculation from said calculation means,
said calculation means being so constructed that said blurring movement correction data is predictively calculated on the basis of said detection data of this time obtained from said detection unit, said detection data of the preceding time and the preceding time of the preceding time registered in said first memory means and said correction data of the preceding time registered in said second memory means so as to correct said shift of the image formed on the film surface by actuating said optical element by said actuator next time and as well that said correction data is corrected on the basis of the focal length in response to said zoom position detection data obtained from said zoom position detection means.

7. A camera having blurring movement correction mechanism comprising:
a blurring movement correction optical element disposed in an optical path of a photo-taking optical system so as to correct shift of an image formed on a film surface caused by movement of hands holding a camera body;
a blurring movement correction actuator for moving said optical element in a necessary direction for correcting said shift of the image on the film surface;
a blurring movement detection unit for obtaining a blurring movement detection data by converting said blurring movement of said camera body to an electric signal;
a first memory means for temporarily registering said detection data output from said detection unit;
a distance measurement means for obtaining subject distance data by measuring the distance to the subject;
a calculation means for calculating blurring movement correction data for correcting said shift of the image formed on the film surface caused by movement of hands holding the camera body by actuating said optical element by said actuator; and
a second memory means for temporarily registering an output data of calculation from said calculation means,
said calculation means being so constructed that said blurring movement correction data is predictively calculated on the basis of said detection data of this time obtained from said detection unit, said detection data of the preceding time registered in said first memory means and said correction data of the preceding time registered in said second memory means so as to correct said shift of the image formed on the film surface by actuating said optical element by said actuator and as well that said correction data is corrected in response to said subject distance data obtained from said distance measurement means.

8. A camera having blurring movement correction mechanism comprising:
a blurring movement correction optical element disposed in an optical path of a photo-taking optical system so as to correct shift of an image formed on a film surface caused by movement of hands holding a camera body;
a blurring movement correction actuator for moving said optical element in a necessary direction for correcting said shift of the image on the film surface;
a blurring movement detection unit for obtaining a blurring movement detection data by converting said blurring movement of said camera body to an electric signal;
a first memory means for temporarily registering said detection data output from said detection unit;

a distance measurement means for obtaining subject distance data by measuring the distance to the subject;

a calculation means for calculating blurring movement correction data for correcting said shift of the image formed on the film surface caused by movement of hands holding the camera body by actuating said optical element by said actuator; and a second memory means for temporarily registering an output data of calculation from said calculation means, said calculation means being so constructed that said blurring movement correction data is predictively calculated on the basis of said detection data of this time obtained from said detection unit, said detection data of the preceding time and the preceding time of the preceding time registered in said first memory means and said correction data of the preceding time registered in said second memory means so as to correct said shift of the image formed on the film surface by actuating said optical element by said actuator next time and as well that said correction data is corrected in response to said subject distance data obtained from said distance measurement means.

9. A camera having blurring movement correction mechanism according to claim 1, wherein velocity of said blurring movement is detected at a plurality of timing points so that predictive velocity at a timing point after predetermined time elapsed is calculated on the basis of the plurality of detected velocity data.

10. A camera having blurring movement correction mechanism according to claim 9, wherein said predictive velocity is calculated on the basis of linear approximately method.

11. A camera having blurring movement correction mechanism according to claim 2, wherein velocity of said blurring movement is detected at a plurality of timing points so that predictive velocity at a timing point after a predetermined time elapsed is calculated on the basis of the plurality of detected velocity data.

12. A camera having blurring movement correction mechanism according to claim 11, wherein said predictive velocity is calculated on the basis of linear approximation method.

* * * * *